US012082225B2

(12) United States Patent
Zhang et al.

(10) Patent No.: US 12,082,225 B2
(45) Date of Patent: Sep. 3, 2024

(54) RULES FOR OVERLAPPED SIGNALS WITH FULL DUPLEX CAPABILITY

(71) Applicant: QUALCOMM INCORPORATED, San Diego, CA (US)

(72) Inventors: Qian Zhang, Basking Ridge, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 427 days.

(21) Appl. No.: 17/387,758

(22) Filed: Jul. 28, 2021

(65) Prior Publication Data

US 2023/0029858 A1 Feb. 2, 2023

(51) Int. Cl.
| | |
|---|---|
| *H04W 72/00* | (2023.01) |
| *H04L 5/14* | (2006.01) |
| *H04W 72/044* | (2023.01) |
| *H04W 72/23* | (2023.01) |
| *H04W 72/53* | (2023.01) |

(52) U.S. Cl.
CPC .............. *H04W 72/53* (2023.01); *H04L 5/14* (2013.01); *H04W 72/046* (2013.01); *H04W 72/23* (2023.01)

(58) Field of Classification Search
None
See application file for complete search history.

(56) References Cited

U.S. PATENT DOCUMENTS

| | | | | |
|---|---|---|---|---|
| 2019/0159155 | A1* | 5/2019 | Abedini | ............ H04W 56/0045 |
| 2019/0207737 | A1 | 7/2019 | Babaei et al. | |
| 2020/0112391 | A1 | 4/2020 | Yang et al. | |
| 2021/0211329 | A1* | 7/2021 | Wu | ...................... H04L 25/0226 |
| 2023/0142814 | A1* | 5/2023 | Beale | .................. H04W 72/569 |
| | | | | 370/277 |

FOREIGN PATENT DOCUMENTS

| | | |
|---|---|---|
| WO | 2017164900 A1 | 9/2017 |
| WO | 2019137116 A1 | 7/2019 |

OTHER PUBLICATIONS

International Search Report and Written Opinion—PCT/US2022/035395—ISA/EPO—Sep. 20, 2022.

* cited by examiner

*Primary Examiner* — Abdelillah Elmejjarmi
(74) *Attorney, Agent, or Firm* — Haynes and Boone, LLP/Qualcomm Incorporated

(57) ABSTRACT

Wireless communications systems and methods related to resolving conflicts between full-duplex signals are provided. A base station may schedule resources for a UE or plurality of UEs. The scheduled resources may include simultaneous uplink and downlink resources. The scheduled resources may utilize beams which if used would cause excessive interference. As such, a conflict resolution action may be performed by the BS and UE to mitigate any problems arising from using both incompatible beams simultaneously. Conflict resolution actions may include dropping one of the signals. Conflict resolution actions may include and changing one or both beam configurations for the signals. Conflict resolution actions may be based on predetermined rules or may be based on an indication from the base station.

30 Claims, 10 Drawing Sheets

RULES FOR OVERLAPPED SIGNALS WITH FULL DUPLEX CAPABILITY

TECHNICAL FIELD

This application relates generally to wireless communication systems, and more particularly to resolving incompatible uplink and downlink signals where at least one of the devices has full duplex capability.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

Devices may utilize full-duplex (FD) communication in order to more efficiently utilize resources. Interference from a variety of sources may cause problems with performing simultaneous UL and DL reliably. Accordingly, methods of determining what actions to perform by both BSs and UEs when incompatible UL and DL communications are scheduled at overlapping times is desirable.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a first wireless communication device comprises a transceiver configured to communicate, with a second wireless communication device, control information indicating a downlink (DL) resource for a first signal. The first wireless communication device further comprises a processor configured to perform a conflict resolution action associated with at least one of the DL resource and a configured grant (CG) resource for a second signal in response to the DL resource at least partially overlapping the CG resource in time. The transceiver is further configured to communicate, in response to the performing the conflict resolution action, at least one of the first signal or the second signal with the second wireless communication device.

In an additional aspect of the disclosure, a first wireless communication device comprises a transceiver configured to communicate, with a second wireless communication device, control information indicating an uplink (UL) resource for a first signal. The first wireless communication device further comprises a processor configured to perform a conflict resolution action associated with at least one of the UL resource and a semi-persistent scheduling (SPS) resource for a second signal in response to the UL resource at least partially overlapping the SPS resource in time. The transceiver is further configured to communicate, in response to the performing the conflict resolution action, at least one of the first signal or the second signal with the second wireless communication device.

In an additional aspect of the disclosure, a method of wireless communication includes communicating, between a first wireless communication device and a second wireless communication device, control information indicating a downlink (DL) resource for a first signal. The method further includes performing, by the first wireless communication device, a conflict resolution action associated with at least one of the DL resource and a configured grant (CG) resource for a second signal in response to the DL resource at least partially overlapping the CG resource in time. The method further includes communicating, in response to the performing the conflict resolution action, at least one of the first signal or the second signal between the first wireless communication device and the second wireless communication device.

In an additional aspect of the disclosure, a method of wireless communication includes communicating, between a first wireless communication device and a second wireless communication device, control information indicating an uplink (UL) resource for a first signal. The method further includes performing, by the first wireless communication device, a conflict resolution action associated with at least one of the UL resource and a semi-persistent scheduling (SPS) resource for a second signal in response to the UL resource at least partially overlapping the SPS resource in time. The method further includes communicating, in response to the performing the conflict resolution action, at least one of the first signal or the second signal between the first wireless communication device and the second wireless communication device.

Other aspects, features, and embodiments of the present invention will become apparent to those of ordinary skill in the art, upon reviewing the following description of specific, exemplary aspects of the present invention in conjunction with the accompanying figures. While features of the present invention may be discussed relative to certain aspects and figures below, all aspects of the present invention can include one or more of the advantageous features discussed herein. In other words, while one or more aspects may be discussed as having certain advantageous features, one or more of such features may also be used in accordance with the various aspects of the invention discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
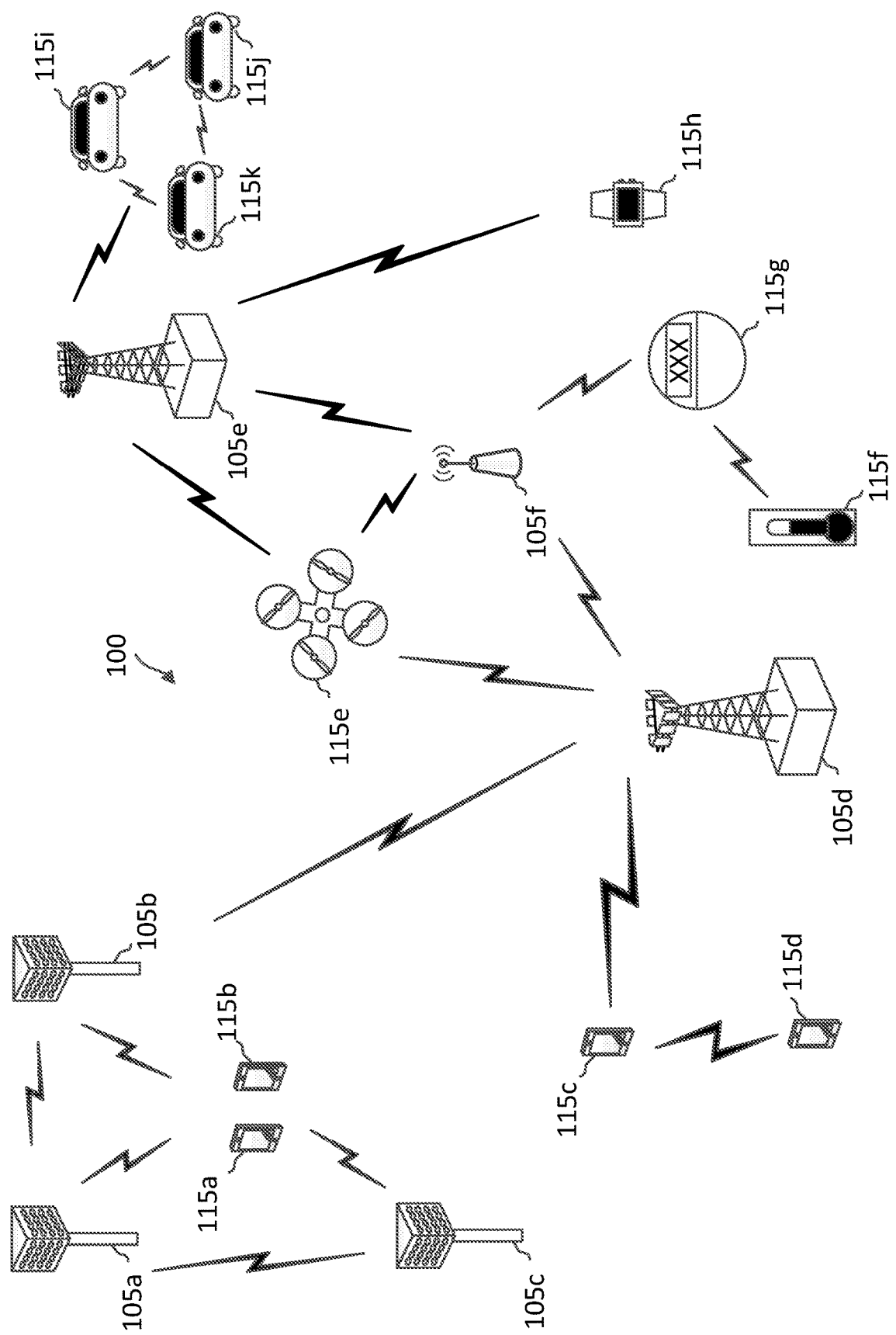
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TT). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), spatial domain multiplexing (SDM), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

BSs and UEs may use beamforming techniques to form directional beams for communications. For instance, a BS and/or a UE may be equipped with one or more antenna panels or antenna arrays with antenna elements that can be configured to focus transmit signal energy and/or receive signal energy in a certain spatial direction and/or within a certain spatial angular sector or width. A beam used for such wireless communications may be referred to as an active beam, a best beam, or a serving beam. The active beam may initially be selected from reference beams and then refined over time. A beam may be defined by a Transmission Configuration Indicator (TCI) state.

To overcome the higher path-loss, networks operating over the sub-THz to THz frequency ranges may deploy BSs with a number of transmission-reception points (TRPs) and/or in smaller areas to reduce the distance or range between a BS and a UE or between a TRP and a UE. In this regard, a BS may include multiple TRPs located at different geographical areas, where the TRPs may operate as radio-heads providing radio frontend (RF) functionalities for over-the-air communications. In some scenarios, certain BS functionalities (e.g., protocol stack related functions) may also be distributed to the TRPs. The TRPs may be located closer to certain UEs, and the BS may communicate with the UEs via the TRPs to reduce the communication range. Additionally, the BSs and/or TRPs may communicate with the UEs using narrower or more focused beams to combat the higher path-loss. In such deployment scenarios, it is possible to take further advantage of the vast number of TRPs and the narrower beams by configuring multiple TRPs to communicate different data streams with the UEs in a spatial domain multiplexing (SDM) configuration to provide further increase in data rates. Different TRPs may be located at different spatial directions from the UE. As such, the UE may use different beams (directed in different beam directions) to communicate with different TRPs (and/or to different beams of the same TRP, using the same or multiple panels on the same TRP). The different beam directions along with the narrower beams can enable simultaneous transmission of different data streams from different TRPs (or from the same TRP) to the UE, and thereby increasing data throughputs.

Some BSs and/or UEs may be capable of full-duplex (FD) communication. A BS or UE may use one antenna panel for a transmit beam while simultaneously using another antenna panel for a receive beam. However, some transmit/receive beam pairs may not be compatible. For example, a UE attempting to receive a signal on a receive beam may have interference from a transmit beam from the same UE. This self-interference may be enough that the receive signal is not able to be decoded reliably. A BS may schedule uplink and downlink signals simultaneously, for example a configured grant (CG) uplink resource may overlap with a channel state information reference signal (CSI-RS). If those signals are scheduled on resources using incompatible beams, one or both of these signals may not be reliably received.

The present application describes mechanisms for mitigating potential problems with incompatible FD signals. When uplink and downlink signals are scheduled simultaneously between devices, they may perform some conflict resolution action for the simultaneously scheduled signals. In some aspects, a conflict resolution action may be based on a predetermined rule such that the BS and UE independently perform the conflict resolution action. In other aspects, a BS may perform the conflict resolution action and communicate to the UE an indication of some conflict resolution action.

For example, when a periodic signal is scheduled for a time overlapping with a semi-static resource in the opposite direction, a conflict resolution rule may be to drop the overlapping downlink signal. Another rule may be to drop the overlapping uplink signal. If both the BS and UE are aware of this rule, then no additional communication occurs for each device to know which signal is dropped. When signals are only partially overlapping, a rule may be to only drop the overlapping portion.

In another example, when a periodic signal is scheduled for a time overlapping with a semi-static resource in the opposite direction, the overlapping downlink signal's beam configuration may be changed to a beam that can be successfully paired with the uplink beam. Alternatively, the uplink signal's beam configuration may be changed. In some aspects, both beam configurations may be changed. Which beams to use may be based on a rule to select from predefined beam pairs, or the BS may indicate to the UE which beams to use.

In some examples, when an aperiodic signal is scheduled for a time overlapping with a semi-static resource in the opposite direction, the BS may indicate to the UE which signal to drop. Alternatively, the BS may indicate a different beam for one or both of the signals which makes the beams compatible. Beams may also be changed based on a predefined rule such that the BS does not necessarily need to indicate to the UE which beams to use. Preconfigured candidate beam pairs may be established which the UE and BS agree upon. Periodic beam management measurements may be performed in order for the BS and/or UE to know which beams are compatible.

Aspects of the present disclosure provide several benefits. For example, latency may be reduces as it is possible to receive DL signals in what would be a UL only slot. More efficient spectrum utilization is possible by allowing for reliable full-duplex communication as UL and DL may share frequency channels. Resolving conflicts in FD signals allows for FD to be used, such that the benefits of FD are realized, while avoiding FD signals from interfering with one another.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 illustrates a wireless communication network 100 according to some aspects of the present disclosure. The network 100 may be a 5G network. The network 100 includes a number of base stations (BSs) 105 (individually labeled as 105*a*, 105*b*, 105*c*, 105*d*, 105*e*, and 105*f*) and other network entities. A BS 105 may be a station that communicates with UEs 115 (individually labeled as 115*a*, 115*b*, 115*c*, 115*d*, 115*e*, 115*f*, 115*g*, 115*h*, and 115*k*) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS 105 for a macro cell may be referred to as a macro BS. A BS 105 for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension, or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

One or more of the BSs 105 may have one or more transmission-reception points (TRPs). This may be done to reduce the distance or range between a BS 105 and a UE 115 or between a TRP and a UE 115. A given BS 105 may, for example, include multiple TRPs located at different geographical areas, where the TRPs may operate as radio-heads providing radio frontend (RF) functionalities for over-the-air communications. In some scenarios, certain BS 105 functionalities (e.g., protocol stack related functions) may also be distributed to the TRPs. Thus, in the example of FIG. 1, some of the BSs 105 may have one or more TRPs (not illustrated), or be themselves examples of TRPs for a remote BS 105.

The network 100 may support synchronous or asynchronous operation. For synchronous operation, the BSs 105 may have similar frame timing, and transmissions from different BSs 105 may be approximately aligned in time. For asynchronous operation, the BSs 105 may have different frame timing, and transmissions from different BSs 105 may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs 105, whether macro BS, small cell, or the like. In FIG. 1, a lightning bolt (e.g., communication links) indicates wireless transmissions between a UE 115 and a serving BS 105, which is a BS 105 designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

Scheduling may be performed by dynamic grants such as by using downlink control information (DCI). Scheduling may also be performed such that multiple repeating resources are scheduled without the need to schedule each instance individually. Such scheduling may broadly be referred to as semi-static. For example, a repeating downlink communication may be scheduled by a BS 105 using semi-persistent scheduling (SPS). SPS may be used to configure a UE 115 with a periodicity of a data transmission using radio resource control (RRC) signaling. SPS may be activated by PDCCH which may carry necessary information about the scheduled resources. Once scheduled and activated, a UE 115 may receive DL transmissions periodically according to the defined periodicity and using the parameters defined by the PDCCH communication.

A similar mechanism to SPS for uplink transmission is configured grant (CG). CG allows for periodic uplink transmissions without a dynamic grant. For CG type 1, a grant is provided to a UE 115 via RRC, including activation of the grant. For CG type 2, the periodicity is provided via RRC, and alternative signaling is used for activation.

In some aspects, some BSs 105 and/or UEs 115 in network 100 may be capable of only half-duplex (HD) communication, meaning they may either transmit or receive but not at the same time. Other BSs 105 and/or UEs 115 in network 100 may be capable of full-duplex (FD) communication, meaning they may simultaneously transmit and receive. For example, this may be done by transmitting using one antenna panel while receiving using another antenna panel. A number of configurations are possible with combinations of FD and HD devices. A FD capable BS may communicate with one UE performing an UL communication while simultaneously performing a DL communication with another UE. A FD capable UE may perform UL communication with one BS while receiving DL communication from another BS. When both UE and BS are capable of FD communication, a single UE/BS pair may perform UL and DL simultaneously with each other.

Even when a device is capable of FD communication, interference between devices, including self-interference by a device with itself, may preclude certain uplink beams from being used simultaneously with certain downlink beams. As such, if two resources are scheduled during overlapping times using incompatible beams, network 100 may determine a resolution to the conflict in order to avoid unwanted interference. Conflict resolution actions may include dropping one signal or the other. Conflict resolution actions may also include changing beams for one signal or the other. The determination may be made by a BS 105 and communicated to a UE 115, and/or the determination may be made based on a rule agreed upon by both the BS 105 and UE 115 without explicit communication at the time of the conflict.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission. The combined random access preamble and connection request in the two-step random access procedure may be referred to as a message A (MSG A). The combined random access response and connection response in the two-step random access procedure may be referred to as a message B (MSG B).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE 115, authenticate the UE 115, and/or authorize the UE 115 for sending and/or receiving data in the network 100. In addition, the AMF may assign the UE 115 with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using hybrid automatic repeat request (HARQ) techniques to improve communication reliability, for example, to provide a ultra-reliable low-latency communication (URLLC) service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 decodes the DL data packet successfully, the UE 115 may transmit a HARQ acknowledgement (ACK) to the BS 105. Conversely, if the UE 115 fails to decode the DL transmission successfully, the UE 115 may transmit a HARQ negative-acknowledgement (NACK) to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple bandwidth parts (BWPs) (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

Figure 2:
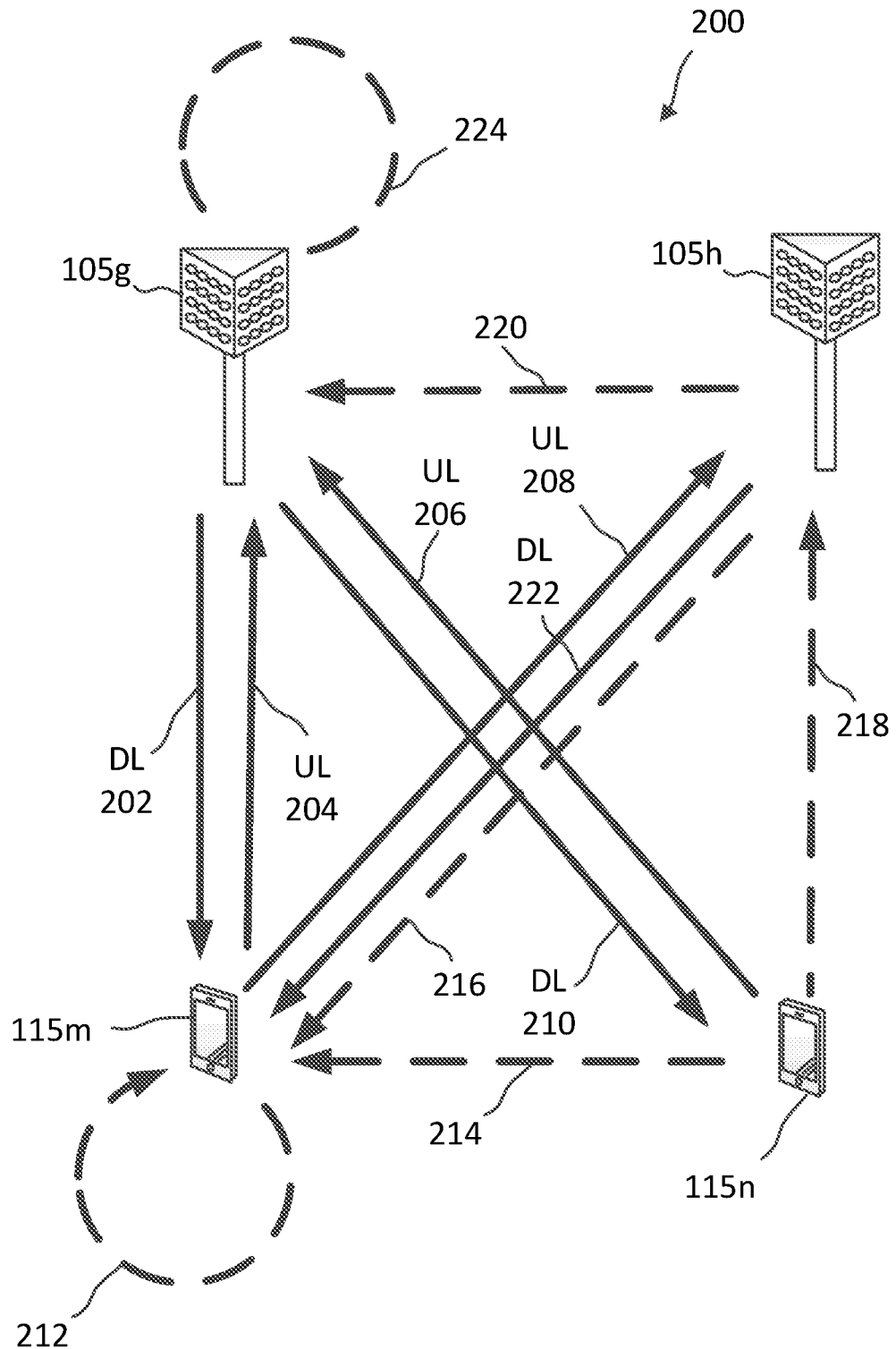
FIG. 2 illustrates an exemplary wireless communication network with full duplex communication according to some aspects of the present disclosure.

FIG. 2 illustrates a wireless communication network 200 with devices that support FD communication. In network 200, at least BS 105g and UE 115m are capable of FD communication. DL 202 and UL 204 may be performed simultaneously. In addition, whether UE 115n is HD or FD, BS 105g may communicate UL 206 and DL 202 simultaneously. BS 105g may also communicate UL 204 and DL 210 simultaneously. Similarly, whether or not BS 105h is HD or FD, UE 115m may communicate DL 202 and UL 208 simultaneously. UE 115m may also communicate UL 204 and DL 222 simultaneously.

Communication network 200 includes some interference sources. Transmissions from BS 105h may cause interference 220 which may interfere with reception at BS 105g. BS 105h may also cause interference 216, which may interfere with reception at UE 115m. UE 115n may cause interference 218, interfering with reception at BS 105h. Finally, a FD capable UE 115m may cause self-interference 212, and a FD capable BS 105g may cause self-interference 224. For example, UL 204 may either directly, or after being reflected and/or scattered, interfere with DL 202. It may be possible to select beam configurations for UL 204 and DL 202 such that any interference is low enough that reception may still be performed reliably. Alternatively, one of either DL 202 or UL 204 could potentially be dropped so that the other may be reliably received. In other aspects, other UL or DL signals such as UL 206, UL 208, DL 222, and DL 210 may be dropped and/or have their beam configurations changed in order to avoid a conflict. Examples of different conflict resolution actions which may be adopted and implemented between devices are discussed further below with respect to the figures.

Figure 3A:
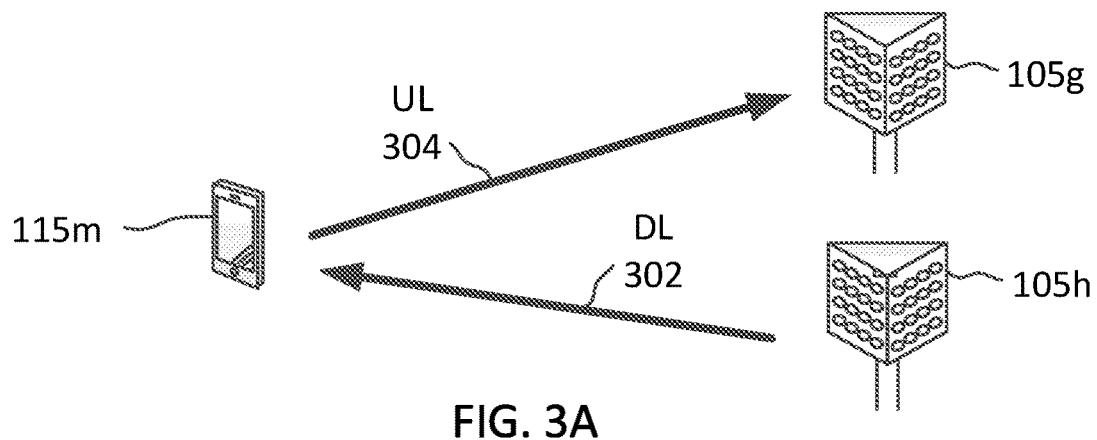
FIGS. 3A-3C illustrate exemplary wireless communication network full duplex use cases according to some aspects of the present disclosure.
Figure 3B:
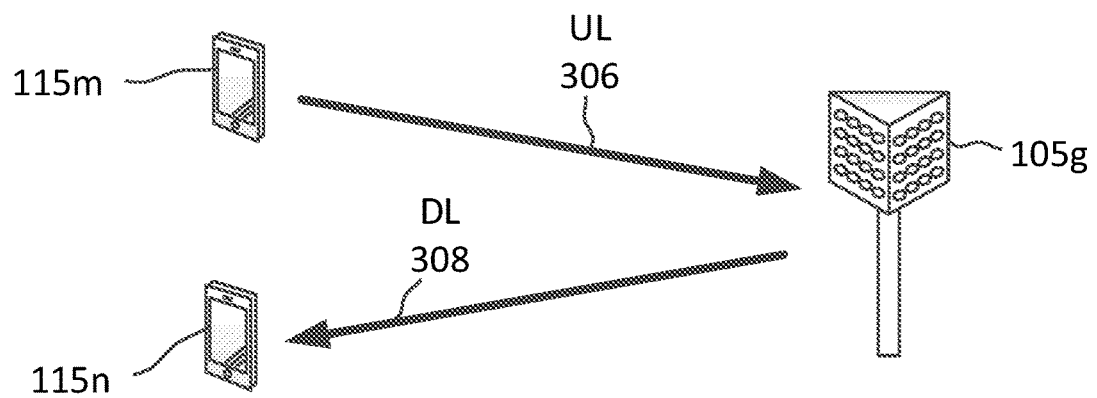
Figure 3C:
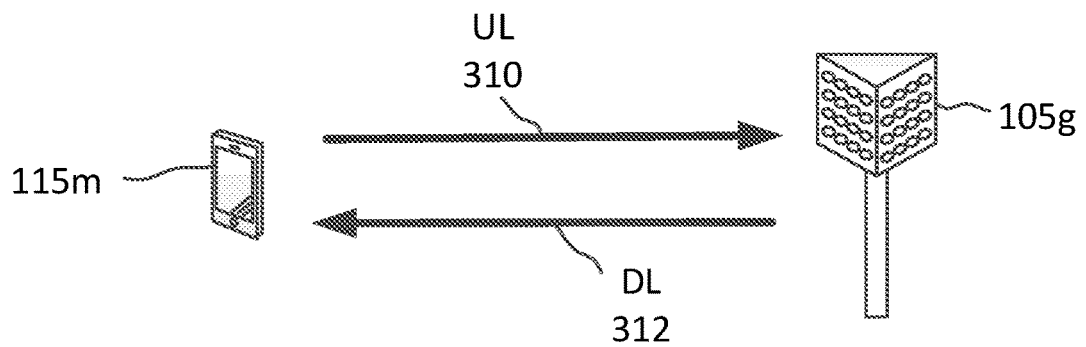

FIG. 3A-3C illustrate various configurations of BSs 105 and UEs 115. FIG. 3A represents a network where UE 115*m* is operating in a FD mode, while BS 105*g* and BS 105*h* are operating in an HD mode. In this scenario, UE 115*m* may transmit UL signal 304 to BS 105*g* while simultaneously receiving DL signal 302 from BS 105*h*. UE 115*m* may also receive a DL signal from 105*g* while transmitting an UL signal to BS 105*h*.

FIG. 3B represents a network where UE 115*m* and UE 115*n* are operating in a HD mode, while BS 105*g* is operating in a FD mode. In this scenario, BS 105*g* may receive UL signal 306 from UE 115*m* while simultaneously transmitting DL signal 308 to UE 115*n*. BS 105*g* may also transmit a DL signal to UE 115*m* while receiving an UL signal from UE 115*n*.

FIG. 3C represents a network where UE 115*m* and BS 105*g* are operating in a FD mode. In this scenario, BS 105*g* may receive UL signal 310 from UE 115*m* while simultaneously transmitting DL signal 312 to UE 115*m*. For simplicity, some examples of conflict resolution actions are described in this disclosure with reference to a particular UE/BS configuration. It should be understood, however, that these are exemplary, and the rules and actions described may be performed by any of the BS and UE combinations illustrated in FIGS. 3A-3C.

Figure 4A:
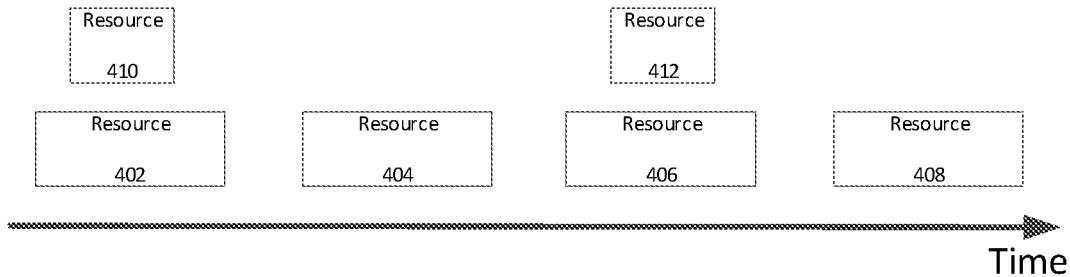
FIGS. 4A-4F illustrate exemplary resource scheduling based on one or more rules according to some aspects of the present disclosure.

FIG. 4A is a timing diagram illustrating scheduled UL and DL resources. A schedule such as one illustrated may be employed by BSs 105 and UEs 115 such as the ones discussed with reference to FIGS. 1-3. In FIG. 4A, the x-axis represents time in some arbitrary units. The resources illustrated in FIG. 4A may represent different types of scheduling communications. For example, in some aspects, resources 402, 404, 406, and 408 represent configured grant (CG) UL resources. In other aspects, resources 402, 404, 406, and 408 represent semi-persistent scheduling (SPS) DL resources. Resources 410 and 412 may represent periodic or aperiodic CSI-RS resources. Resources 410 and 412 may also represent periodic or aperiodic sounding reference signal (SRS) resources.

These types of resources are exemplary, and other types of scheduling resources may be used within the scope of the present disclosure. Overlapping resources should be understood to be resources for communication in opposite directions (i.e. transmit and receive). The resources in FIG. 4A show an example of scheduled resources before any conflict resolution action has been determined or performed. As such, each resource is shown as scheduled with no indication of a change, even where signals overlap in time.

FIGS. 4B-4F illustrate the state of the resources (described with respect to FIG. 4A) after a conflict resolution action has been performed, as will be described in detail with reference to each figure. An X through a resource indicates dropping the corresponding signal (i.e. not transmitting or receiving). A resource with a dashed line border indicates the beam configuration associated with the resource is changed. In general, each of FIGS. 4B-4F illustrates performing one or more different conflict resolution actions according to respective rules (e.g., each figure illustrating action(s) according to a different rule). Accordingly, one of the rules may be adopted and applied between devices to resolve overlapping scheduling conflicts as noted above. In some examples the rule adopted may be static. The static rule may be based on a standard such that every device follows the rule. In other examples, the rule in use may dynamically change over time, based on one or more factors such as network configuration, device configuration, operating conditions, and so forth. In some aspects, a BS 105 may indicate to a UE 115 a configuration indicating which rule to employ. This may be done, for example, when the BS 105 and UE 115 are establishing a connection, or at some other point via a broadcast signal from the BS 105.

Figure 4B:
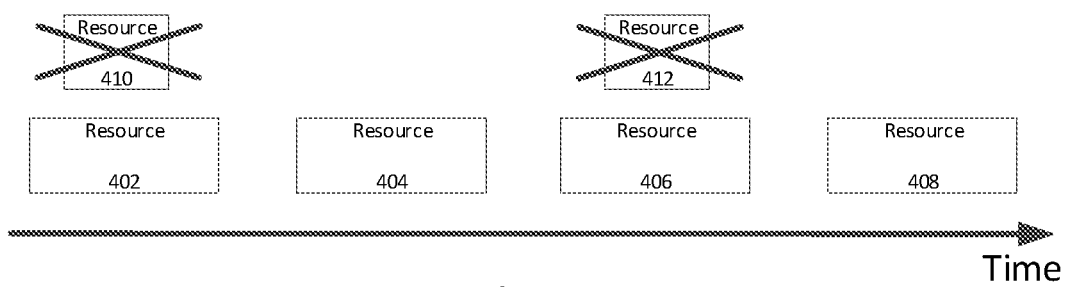

For example, FIG. 4B illustrates resources 410 and 412 being dropped as a conflict resolution action based on a rule known between devices. When a resource 410 is a periodic signal, a predefined rule may be established that the signal will be dropped when it overlaps with a signal in the other direction. The UE 115 and the BS 105 may both be aware of the rule, such that whenever this scenario occurs both devices know how to resolve the conflict without additional communication.

In some aspects, resources 410 and 412 in FIG. 4B may represent periodic CSI-RS resources, and resources 402, 404, 406, and 408 represent CG resources. When a periodic CSI-RS resource such as resource 410 overlaps in time a CG occasion such as resource 402, the UE 115 and BS 105 may each drop the CSI-RS signal based on a predefined rule. Accordingly, the BS 105 would know to not transmit the CSI-RS signal, and the UE 115 would know to not expect the CSI-RS signal.

In some other aspects, resources 410 and 412 in FIG. 4B may represent periodic SRS resources, and resources 402, 404, 406, and 408 represent SPS resources. When a periodic SRS resource such as resource 410 overlaps in time a SPS occasion such as resource 402, the UE 115 and BS 105 may each drop the SRS based on a predefined rule. Accordingly, the BS 105 would not expect the SRS, and the UE 115 would know to not transmit a SRS to BS 105.

Figure 4C:
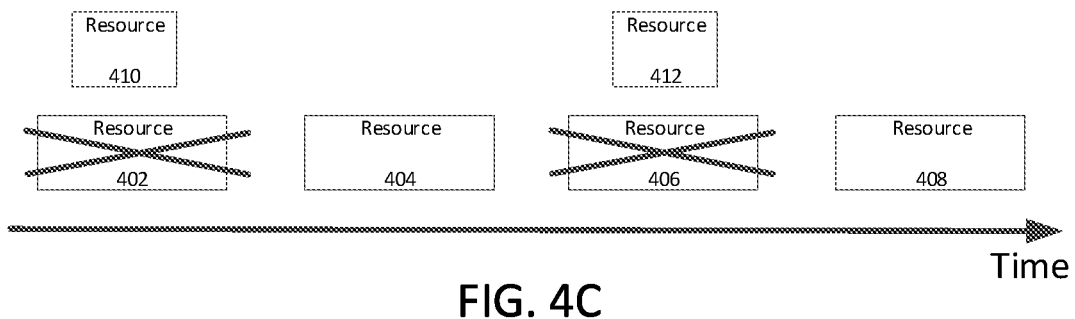

As another example of a conflict resolution action defined by a different possible rule, FIG. 4C illustrates resources 402 and 406 being dropped. This may be done when resources 410 and 412 are either periodic or aperiodic resource. When resources 410 and 412 represent a periodic signal such as a periodic CSI-RS or periodic SRS, a predefined rule may be established that the overlapping signal, such as a CG UL resource or an SPS DL resource, will be dropped. The UE 115 and the BS 105 may both be aware of the rule, such that whenever this scenario occurs both devices know how to resolve the conflict without additional communication. In some aspects, if the resources 402 or 406 are only partially overlapped by resources 410 and 412 respectively, only the overlapping portion may be dropped.

In some aspects, resources 410 and 412 in FIG. 4C may represent periodic CSI-RS resources, and resources 402, 404, 406, and 408 represent CG resources. When a periodic CSI-RS resource such as resource 410 overlaps in time a CG occasion such as resource 402, the UE 115 and BS 105 may each agree by a predefined rule to drop or partially drop the overlapped CG occasion. This may be done without extra communication between the BS 105 and the UE 115

In some other aspects, resources 410 and 412 in FIG. 4C may represent periodic SRS resources, and resources 402, 404, 406, and 408 represent SPS resources. When a periodic SRS resource such as resource 410 overlaps in time a SPS occasion such as resource 402, the UE 115 and BS 105 may each agree by a predefined rule to drop or partially drop the overlapped CG occasion.

When resource 410 and 412 represent aperiodic signals, such as a dynamically scheduled CSI-RS or SRS, the overlapped signal may also be dropped. In some aspects, the determination to drop or not drop the overlapped signal may be based on a predefined rule as described above.

In some aspects, resources 410 and 412 in FIG. 4C may represent aperiodic CSI-RS resources, and resources 402, 404, 406, and 408 represent CG resources. When an aperiodic CSI-RS resource such as resource 410 overlaps in time a CG occasion such as resource 402, the UE 115 and BS 105 may each agree by a predefined rule to drop the overlapped CG occasion 402.

In some additional aspects, resources 410 and 412 in FIG. 4C may represent aperiodic SRS resources, and resources 402, 404, 406, and 408 represent SPS resources. When an aperiodic SRS resource such as resource 410 overlaps in time a SPS occasion such as resource 402, the UE 115 and BS 105 may each agree by a predefined rule to drop the overlapped SPS occasion 402.

The conflict resolution action depicted in FIG. 4C may also be accomplished by the BS 105 indicating to the UE 115 whether to drop the overlapping communication. For example, the BS 105 may include information in the DCI that is used to schedule resource 410 indicating that the corresponding resource 402 should be dropped. The information may be in a new or otherwise unused field of the DCI.

In some aspects, resources 410 and 412 in FIG. 4C may represent aperiodic CSI-RS resources, and resources 402, 404, 406, and 408 represent CG resources. When an aperiodic CSI-RS resource such as resource 410 overlaps in time a CG occasion such as resource 402, the BS 105 may indicate a conflict resolution action to the UE 115. The BS 105, in the DCI scheduling the CSI-RS resource 410, may indicate to drop the overlapping CG occasion 402. The DCI may include an indication of the CG occasion number.

In some aspects, resources 410 and 412 in FIG. 4C may represent aperiodic SRS resources, and resources 402, 404, 406, and 408 represent SPS resources. When an aperiodic SRS resource such as resource 410 overlaps in time a SPS occasion such as resource 402, the BS 105 may indicate a conflict resolution action to the UE 115. The BS 105, in the DCI scheduling the SRS resource 410, may indicate to drop the overlapping SPS occasion 402. The DCI may include an indication of the SPS occasion number that identifies the SPS occasion 402.

The conflict resolution action depicted in FIG. 4C may also be accomplished by a UE 115 or a BS 105 determining whether the UL resource's beam configuration is compatible with the overlapping DL resource's beam configuration. The determination may be based on periodic beam management measurements, or preconfigured candidate beam pairs. The UE 115 may maintain a list of candidate beam pairs with corresponding measurement parameters. The beam pairs may be communicated previously by the BS 105 to the UE 115. When a UE 115 and BS 105 know, based on the previous measurements and/or based on the preconfigured beam pair list, that the beams of the overlapping resources are incompatible, they may drop the communication associated with one of the resources such as resources 402 and 406.

In some aspects, resources 410 and 412 in FIG. 4C may represent aperiodic CSI-RS resources, and resources 402, 404, 406, and 408 represent CG resources. When the UE 115 receives the scheduling information for CSI-RS at resource 410, the UE 115 and BS 105 may determine that the beam associated with that resource is incompatible with the beam associated with resource 402. The UE 115 and BS 105 may then drop or partially drop CG occasion 402.

In some aspects, resources 410 and 412 in FIG. 4C may represent aperiodic SRS resources, and resources 402, 404, 406, and 408 represent SPS resources. When the UE 115 receives the scheduling information for SRS at resource 410, the UE 115 and BS 105 may determine that the beam associated with that resource is incompatible with the beam associated with resource 402. The UE 115 and BS 105 may then drop or partially drop SPS occasion 402.

Figure 4D:
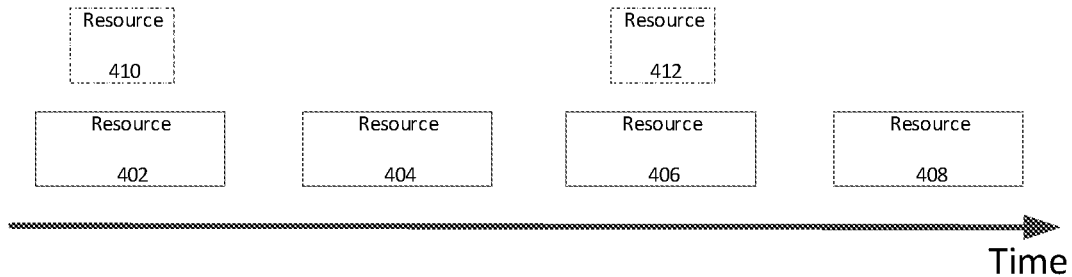

FIG. 4D illustrates resource 410 and 412 having changed beam configurations as a conflict resolution action based on a rule known between devices. Resources 410 and 412 may change beam configurations whether they are periodic or aperiodic resources. When resources 410 and 412 are periodic resources, such as a periodic CSI-RS, a new beam configuration for the CSI-RS may be determined based on previous measurements, or preconfigured candidate beam pairs. Measurements used to make the determination may be performed by the BS 105 or the UE 115.

In some aspects, resources 410 and 412 in FIG. 4D may represent periodic CSI-RS resources, and resources 402, 404, 406, and 408 represent CG resources. When a periodic CSI-RS resource such as resource 410 overlaps in time a CG occasion such as resource 402, the UE 115 and BS 105 may change the overlapping CSI-RS occasion's beam configuration (TCI state) to one compatible with that of the CG beam configuration based on previous measurements, or preconfigured candidate beam pairs.

In some aspects, resources 410 and 412 in FIG. 4D may represent periodic SRS resources, and resources 402, 404, 406, and 408 represent SPS resources. When a periodic SRS resource such as resource 410 overlaps in time a SPS occasion such as resource 402, the UE 115 and BS 105 may change the overlapping SRS occasion's beam configuration (TCI state) to one compatible with that of the SPS beam configuration based on previous measurements, or preconfigured candidate beam pairs.

When resources 410 and 412 are aperiodic, the conflict resolution action depicted in FIG. 4D may also be accomplished by a beam configuration being determined based on a predefined rule. The rule may inform the BS and UE to select a new beam configuration for one of the overlapping signals based on previous measurements or preconfigured candidate beam pairs.

In some aspects, resources 410 and 412 in FIG. 4D may represent aperiodic CSI-RS resources, and resources 402, 404, 406, and 408 represent CG resources. When an aperiodic CSI-RS resource such as resource 410 overlaps in time a CG occasion such as resource 402, the UE 115 and BS 105 may change the overlapping CSI-RS resource's beam configuration (TCI state) based on a rule to one compatible with that of the CG beam configuration based on previous measurements, or preconfigured candidate beam pairs.

In some aspects, resources 410 and 412 in FIG. 4D may represent aperiodic SRS resources, and resources 402, 404, 406, and 408 represent SPS resources. When an aperiodic SRS resource such as resource 410 overlaps in time a SPS occasion such as resource 402, the UE 115 and BS 105 may change the overlapping SRS resource's beam configuration (TCI state) based on a rule to one compatible with that of the SPS beam configuration based on previous measurements, or preconfigured candidate beam pairs.

Figure 4E:
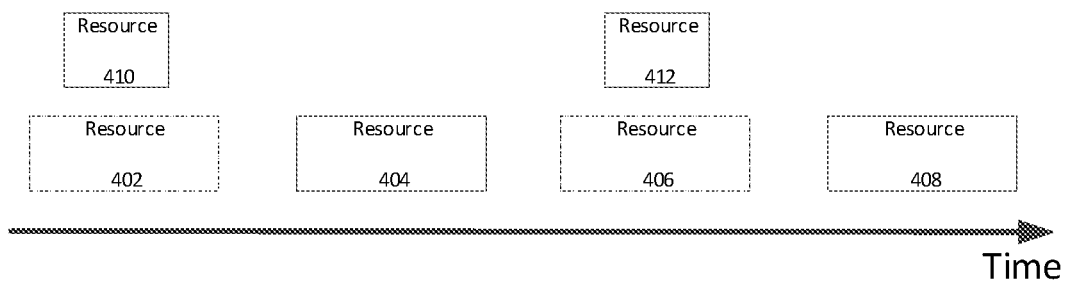

FIG. 4E illustrates resources 402 and 406 having changed beam configurations as a conflict resolution action based on a rule known between devices. This may be done similarly to changing the beam configurations of resources 410 and 412 as described with reference to FIG. 4D. When resources 410 and 412 are aperiodic, the beam information may be determined based on a predefined rule which informs the BS and UE to select a new beam configuration for one of the overlapping signals based on previous measurements or preconfigured candidate beam pairs.

In some aspects, resources 410 and 412 in FIG. 4E may represent aperiodic CSI-RS resources, and resources 402, 404, 406, and 408 represent CG resources. When an aperiodic CSI-RS resource such as resource 410 overlaps in time a CG occasion such as resource 402, the UE 115 and BS 105 may change the overlapping CG occasion's beam configuration (TCI state) based on a rule to one compatible with that of the CSI-RS beam configuration based on previous measurements, or preconfigured candidate beam pairs.

In some aspects, resources 410 and 412 in FIG. 4E may represent aperiodic SRS resources, and resources 402, 404, 406, and 408 represent SPS resources. When an aperiodic SRS resource such as resource 410 overlaps in time a SPS occasion such as resource 402, the UE 115 and BS 105 may change the overlapping SPS occasion's beam configuration (TCI state) based on a rule to one compatible with that of the SRS beam configuration based on previous measurements, or preconfigured candidate beam pairs.

When resources 410 and 412 are aperiodic, the conflict resolution action depicted in FIG. 4E may also be accomplished by the beam information for resource 402 being provided by the BS 105. The BS 105 may include the beam configuration information in the DCI which schedules resource 410, and the beam configuration information for resource 406 may be provided by the BS 105 in the DCI scheduling resource 412. The DCI fields used may be new fields, or repurposed existing fields. Beam configurations may also be based on preconfigured candidate beam pairs.

In some aspects, resources 410 and 412 in FIG. 4E may represent aperiodic CSI-RS resources, and resources 402, 404, 406, and 408 represent CG resources. When an aperiodic CSI-RS resource such as resource 410 overlaps in time a CG occasion such as resource 402, the BS 105 may indicate a conflict resolution action to the UE 115. The BS 105, in the DCI scheduling the CSI-RS resource 410, may indicate an UL beam for the corresponding overlapped CG occasion 402. The DCI may include an indication of the CG occasion number.

In some aspects, resources 410 and 412 in FIG. 4E may represent aperiodic SRS resources, and resources 402, 404, 406, and 408 represent SPS resources. When an aperiodic SRS resource such as resource 410 overlaps in time a SPS occasion such as resource 402, the BS 105 may indicate a conflict resolution action to the UE 115. The BS 105, in the DCI scheduling the SRS resource 410, may indicate a DL beam for the corresponding overlapped SPS occasion 402. The DCI may include an indication of the SPS occasion number.

When resources 410 and 412 are periodic resources, such as a periodic CSI-RS, the conflict resolution action depicted in FIG. 4E may also be accomplished by a new beam configuration being determined based on a rule. The rule may use previous measurements, or preconfigured candidate beam pairs in order to determine which beam configuration to use. Measurements used to make the determination may be performed by the BS 105 or the UE 115.

In some aspects, resources 410 and 412 in FIG. 4E may represent periodic CSI-RS resources, and resources 402, 404, 406, and 408 represent CG resources. When a periodic CSI-RS resource such as resource 410 overlaps in time a CG occasion such as resource 402, the UE 115 and BS 105 may change the overlapping CG occasion's beam configuration (TCI state) based on a rule, to one compatible with that of the CSI-RS beam configuration based on previous measurements, or preconfigured candidate beam pairs.

In some aspects, resources 410 and 412 in FIG. 4E may represent periodic SRS resources, and resources 402, 404, 406, and 408 represent SPS resources. When a periodic SRS resource such as resource 410 overlaps in time a SPS occasion such as resource 402, the UE 115 and BS 105 may change the overlapping SPS occasion's beam configuration (TCI state) based on a rule, to one compatible with that of the SRS beam configuration based on previous measurements, or preconfigured candidate beam pairs.

Figure 4F:
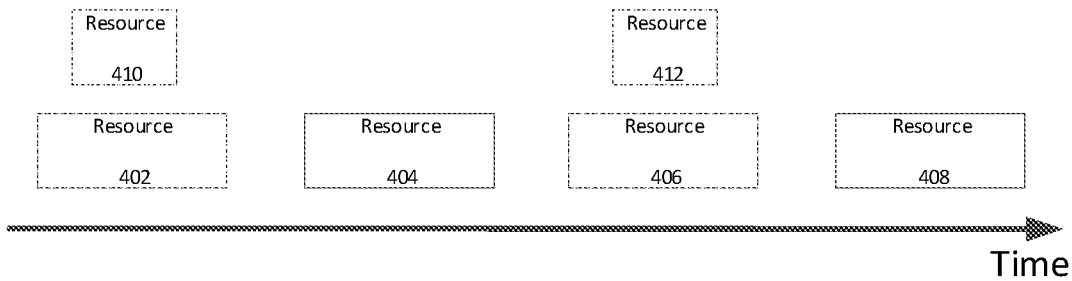

FIG. 4F illustrates resources 402, 406, 410, and 412 having changed beam configurations as a conflict resolution action based on a rule known between devices. If resources are scheduled overlapping in time with incompatible beams, and neither of the beams have a compatible pair, both beam configuration may be changed. When resources 410 and 412 represent an aperiodic resource, the DCI used to schedule the aperiodic resource may contain the beam configuration information.

In some aspects, resources 410 and 412 in FIG. 4E may represent periodic CSI-RS resources, and resources 402, 404, 406, and 408 represent CG resources. When a periodic CSI-RS resource such as resource 410 overlaps in time a CG occasion such as resource 402, the BS 105 may include in the DCI that schedules the CSI-RS, a bi-directional beam configuration whose DL configuration may apply to the CSI-RS and the UL configuration may automatically overwrite the UL beam configuration associated with the CG occasion 402.

In some aspects, resources 410 and 412 in FIG. 4E may represent periodic SRS resources, and resources 402, 404, 406, and 408 represent SPS resources. When a periodic SRS resource such as resource 410 overlaps in time a SPS occasion such as resource 402, the BS 105 may include in the DCI that schedules the SRS, a bi-directional beam configuration whose UL configuration may apply to the SRS and the DL configuration may automatically overwrite the DL beam configuration associated with the SPS occasion 402.

Figure 5:
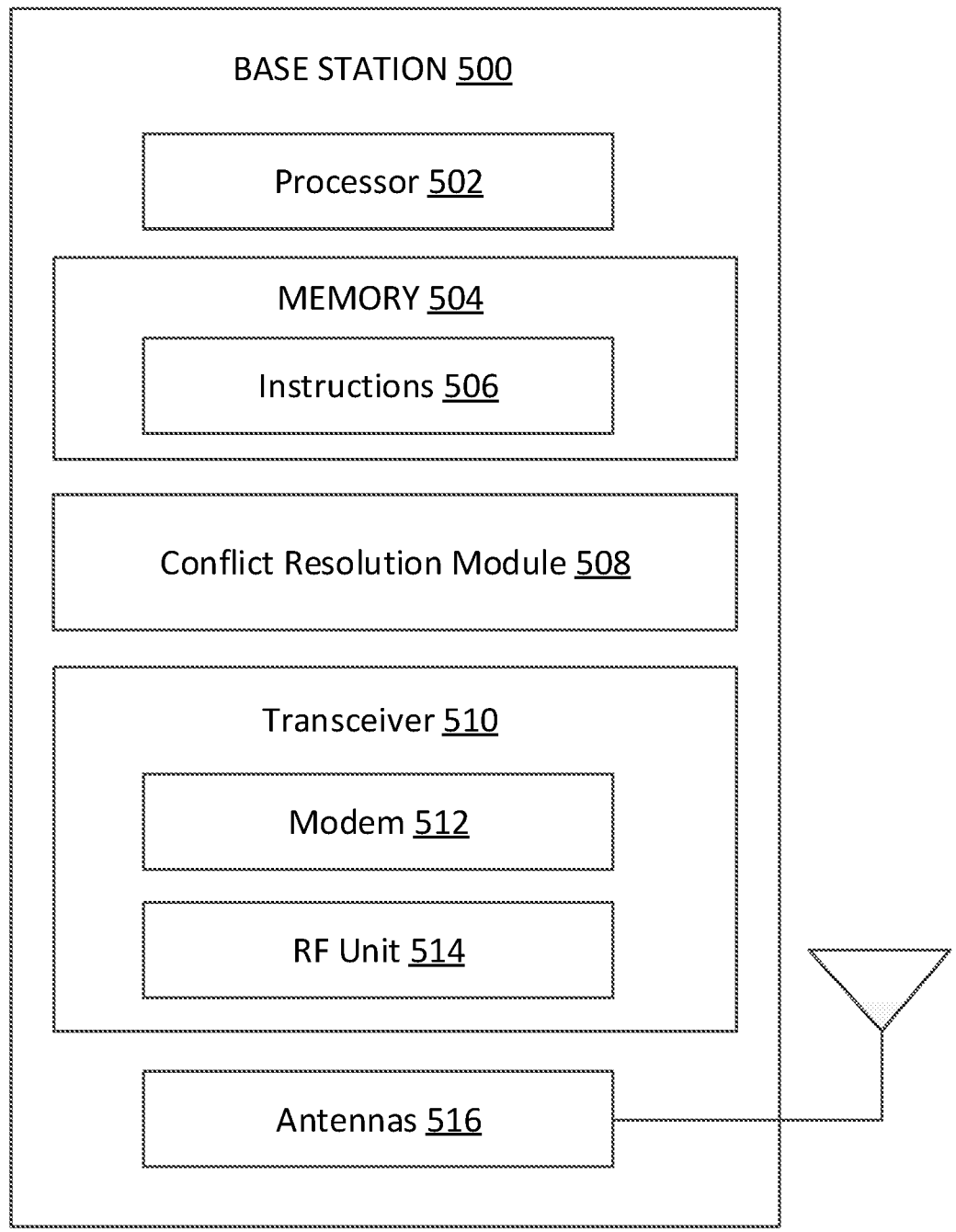
FIG. 5 illustrates a block diagram of an exemplary base station (BS) according to some aspects of the present disclosure.

FIG. 5 is a block diagram of an exemplary BS 500 according to some aspects of the present disclosure. In some instances, the BS 500 may be a BS 105 in the network 100 as discussed above in FIG. 1. In some other instances, the BS 500 may be a BS 105g and/or BS 105h discussed above with reference to FIGS. 2-3. As explained above, a TRP may implement at least RF functionalities, but may also implement some baseband processing and/or protocol stack layer processing similar to a BS 105. As shown, the BS 500 may include a processor 502, a memory 504, a conflict resolution module 508, a transceiver 510 including a modem subsystem 512 and a RF unit 514, and one or more antennas 516. These elements may be coupled with one another. The term "coupled" may refer to directly or indirectly coupled or connected to one or more intervening elements. For instance, these elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 1-4 and 7-9. Instructions 506 may also be referred to as program code. The program code may be for causing a wireless communication device to perform these operations, for example by causing one or more processors (such as processor 502) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The conflict resolution module 508 may be implemented via hardware, software, or combinations thereof. For example, the conflict resolution module 508 may be implemented as a processor, circuit, and/or instructions 506 stored in the memory 504 and executed by the processor 502. In some examples, the conflict resolution module 508 can be integrated within the modem subsystem 512. For example, the conflict resolution module 508 can be implemented by a combination of software components (e.g., executed by a DSP or a general processor) and hardware components (e.g., logic gates and circuitry) within the modem subsystem 512.

The conflict resolution module 508 may communicate with various components of the BS 500 to perform various aspects of the present disclosure, for example, aspects of FIGS. 1-4 and 7-9. The conflict resolution module 508 may determine a conflict resolution action based on predefined rules, and/or configuration. In some aspects, the conflict resolution module 508 is configured to transmit a DCI with scheduling information and beam configuration information. The beam configuration information may be for the resource scheduled in the same DCI, or a new beam configuration for a previously configured resource. For example, the conflict resolution module 508 may determine that a CSI-RS signal scheduled in a DCI is in conflict with an already scheduled CG communication. The conflict resolution module may indicate to the UE 115 a different beam configuration for the CSI-RS signal, or a replacement beam configuration for the overlapping CG signal, or both.

In some aspects, the conflict resolution module 508 may indicate to a UE 115 to drop a scheduled communication when there is a FD conflict. For example, the conflict resolution module 508 may determine that a SRS signal scheduled in a DCI is in conflict with an already scheduled SPS communication. In order to avoid excessive interference, the conflict resolution module may indicate to the UE 115 to drop either the SRS signal or the overlapped SPS. The conflict resolution module 508 may determine to drop one or the other based on a predefined rule, or may determine to drop one or the other based on a determination that the beams utilized are not compatible. In some aspects, the conflict resolution module 508 does not explicitly communicate a conflict resolution to a UE 115, but rather the UE 115 independently makes the same determination as the BS 105 based on a predetermined rule.

The conflict resolution module 508 may maintain a list of preconfigured candidate beam pairs. This list may be communicated to a UE 115 as well. The list of preconfigured candidate beam pairs may be ordered such that the UE 115 and the BS 105 know which beam pairs are preferred. The conflict resolution module 508 may periodically make beam measurements to inform the determination of a conflict resolution action and/or the determination of candidate beam pairs.

As shown, the transceiver 510 may include the modem subsystem 512 and the RF unit 514. The transceiver 510 can be configured to communicate bi-directionally with other devices, such as the UEs 115 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., RRC configuration, CSI-RS resource configuration, CSI-RS report configuration, CSI-RSs, SSB beams) from the modem subsystem 512 (on outbound transmissions) or of transmissions originating from another source such as a UE 115. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may further receive data messages transmitted from other devices and provide the received data messages for processing and/or demodulation at the transceiver 510. The transceiver 510 may provide the demodulated and decoded data (e.g., messages indicating reference signals) to the conflict resolution module 508 for processing. The antennas 516 may include multiple antennas of similar or different designs in order to sustain multiple transmission links. In some aspects, the antennas 516 may in the form of one or more antenna panels or one or more antenna arrays each including a plurality of antenna element that can be selectively configured with different gains and/or phases to generate a beam for transmission and/or reception.

Figure 6:
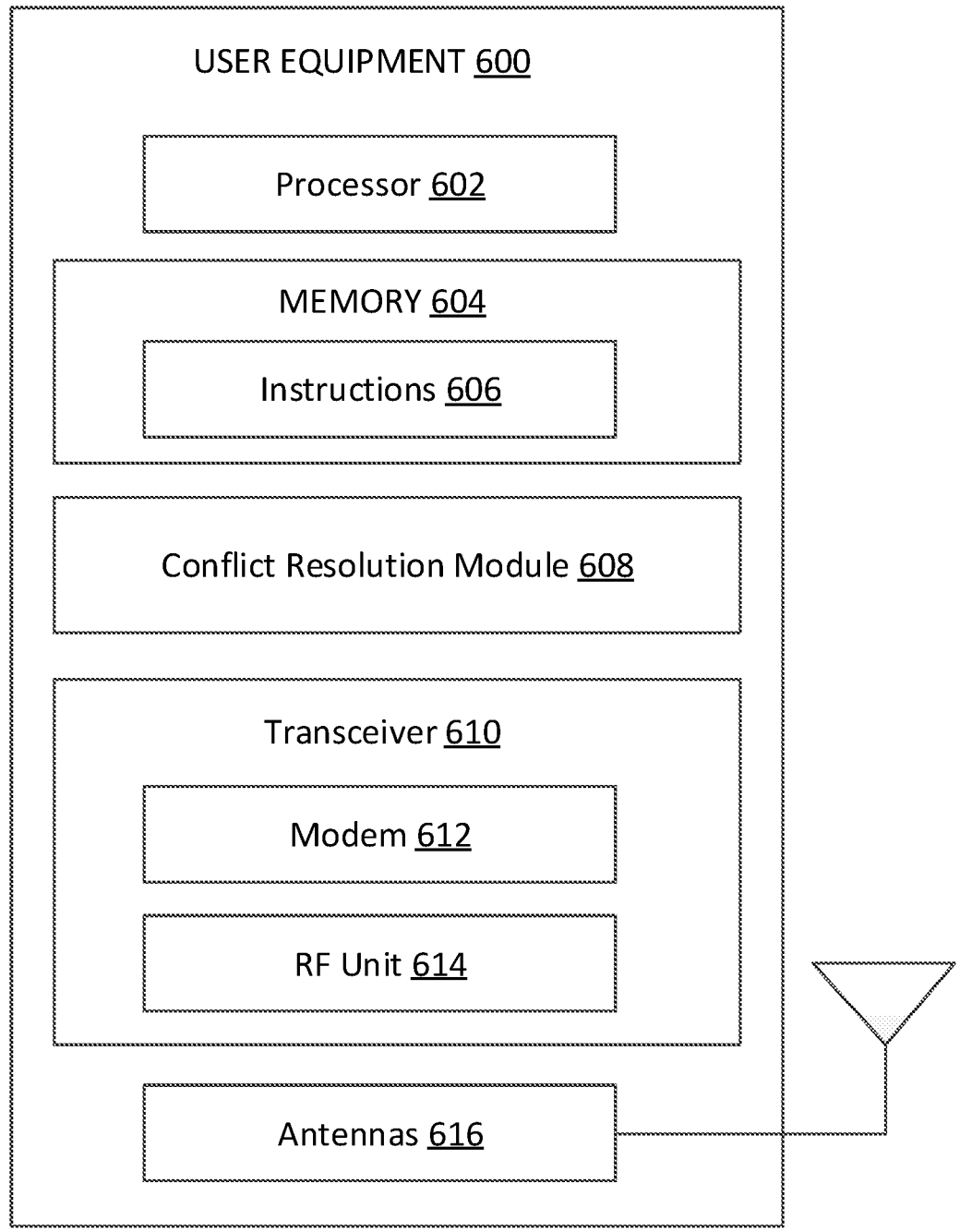
FIG. 6 illustrates a block diagram of an exemplary user equipment (UE) according to some aspects of the present disclosure.

FIG. 6 is a block diagram of an exemplary UE 600 according to some aspects of the present disclosure. In some instances, the UE 600 may be a UE 115 as discussed above with respect to FIGS. 1-3. As shown, the UE 600 may include a processor 602, a memory 604, a conflict resolution module 608, a transceiver 610 including a modem subsystem 612 and a radio frequency (RF) unit 614, and one or more antennas 616. These elements may be coupled with one another. The term "coupled" may refer to directly or indirectly coupled or connected to one or more intervening elements. For instance, these elements may be in direct or indirect communication with each other, for example via one or more buses.

The processor 602 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 604 includes a non-transitory computer-readable medium. The memory 604 may store, or have recorded thereon, instructions 606. The instructions 606 may include instructions that, when executed by the processor 602, cause the processor 602 to perform the operations described herein with reference to the UEs 115 in connection with aspects of the present disclosure, for example, aspects of FIGS. 1-4 and 7-9. Instructions 606 may also be referred to as program code, which may be interpreted broadly to include any type of computer-readable statement(s) as discussed above with respect to FIG. 5.

The conflict resolution module 608 may be implemented via hardware, software, or combinations thereof. For example, the conflict resolution module 608 may be implemented as a processor, circuit, and/or instructions 606 stored in the memory 604 and executed by the processor 602. In some examples, the conflict resolution module 608 can be integrated within the modem subsystem 612. For example, the conflict resolution module 608 can be implemented by a combination of software components (e.g., executed by a DSP or a general processor) and hardware components (e.g., logic gates and circuitry) within the modem subsystem 612.

The conflict resolution module 608 may communicate with various components of the UE 600 to perform aspects of the present disclosure, for example, aspects of FIGS. 1-4 and 7-9. The conflict resolution module 608 may determine conflict resolution actions based on predefined rules or configuration. In some aspects, the conflict resolution module 608 is configured to receive a DCI with scheduling information and beam configuration information. The beam configuration information may be for the resource scheduled in the same DCI, or a new beam configuration for a previously configured resource. For example, the conflict resolution module 608 may receive an indication from the BS 105 of a different beam configuration for the CSI-RS signal, or a replacement beam configuration for the overlapping CG signal, or both.

In some aspects, the conflict resolution module 608 may receive an indication from a BS 105 to drop a scheduled communication when there is a FD conflict. For example, when an SRS signal and an SPS signal are scheduled overlapping, the conflict resolution module 608 may receive an indication from a BS 105 the UE 115 should drop either the SRS signal or the overlapped SPS. The conflict resolution module 608 may determine to drop one or the other based on a predefined rule, or may determine to drop one or the other based on a determination that the beams utilized are not compatible. In some aspects, the conflict resolution module 608 does receive an explicit communication of a conflict resolution action from a BS 105, but rather the conflict resolution module 608 independently makes the same determination as the BS 105 based on a predetermined rule.

The conflict resolution module 608 may maintain a list of preconfigured candidate beam pairs. This list may be self-determined based on measurements, or configured by a BS 105. The list of preconfigured candidate beam pairs may be ordered such that the UE 115 and the BS 105 know which beam pairs are preferred. The conflict resolution module 608 may periodically make beam measurements to inform the determination of a conflict resolution action and/or the determination of candidate beam pairs.

As shown, the transceiver 610 may include the modem subsystem 612 and the RF unit 614. The transceiver 610 can be configured to communicate bi-directionally with other devices, such as the BSs 105. The modem subsystem 612 may be configured to modulate and/or encode the data from the memory 604 and/or the conflict resolution module 608 according to a modulation and coding scheme (MCS), e.g., a low-density parity check (LDPC) coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data (e.g., UE capability report, beam reports) from the modem subsystem 612 (on outbound transmissions) or of transmissions originating from another source such as a UE 115 or a BS 105. The RF unit 614 may be further configured to perform analog beamforming in conjunction with the digital beamforming. Although shown as integrated together in transceiver 610, the modem subsystem 612 and the RF unit 614 may be separate devices that are coupled together at the UE 115 to enable the UE 115 to communicate with other devices.

The RF unit 614 may provide the modulated and/or processed data, e.g. data packets (or, more generally, data messages that may include one or more data packets and other information), to the antennas 616 for transmission to one or more other devices. The antennas 616 may further receive data messages transmitted from other devices. The antennas 616 may provide the received data messages for processing and/or demodulation at the transceiver 610. The transceiver 610 may provide the demodulated and decoded data (e.g., Common PathlossReferenceRS configuration, and/or a pathlossReferenceRS upon receipt) to the conflict resolution module 608 for processing. The antennas 616 may include multiple antennas of similar or different designs in order to sustain multiple transmission links. The RF unit 614 may configure the antennas 616. In some aspects, the antennas 616 may in the form of one or more antenna panels or one or more antenna arrays each including a plurality of antenna element that can be selectively configured with different gains and/or phases to generate a beam for transmission and/or reception.

Figure 7:
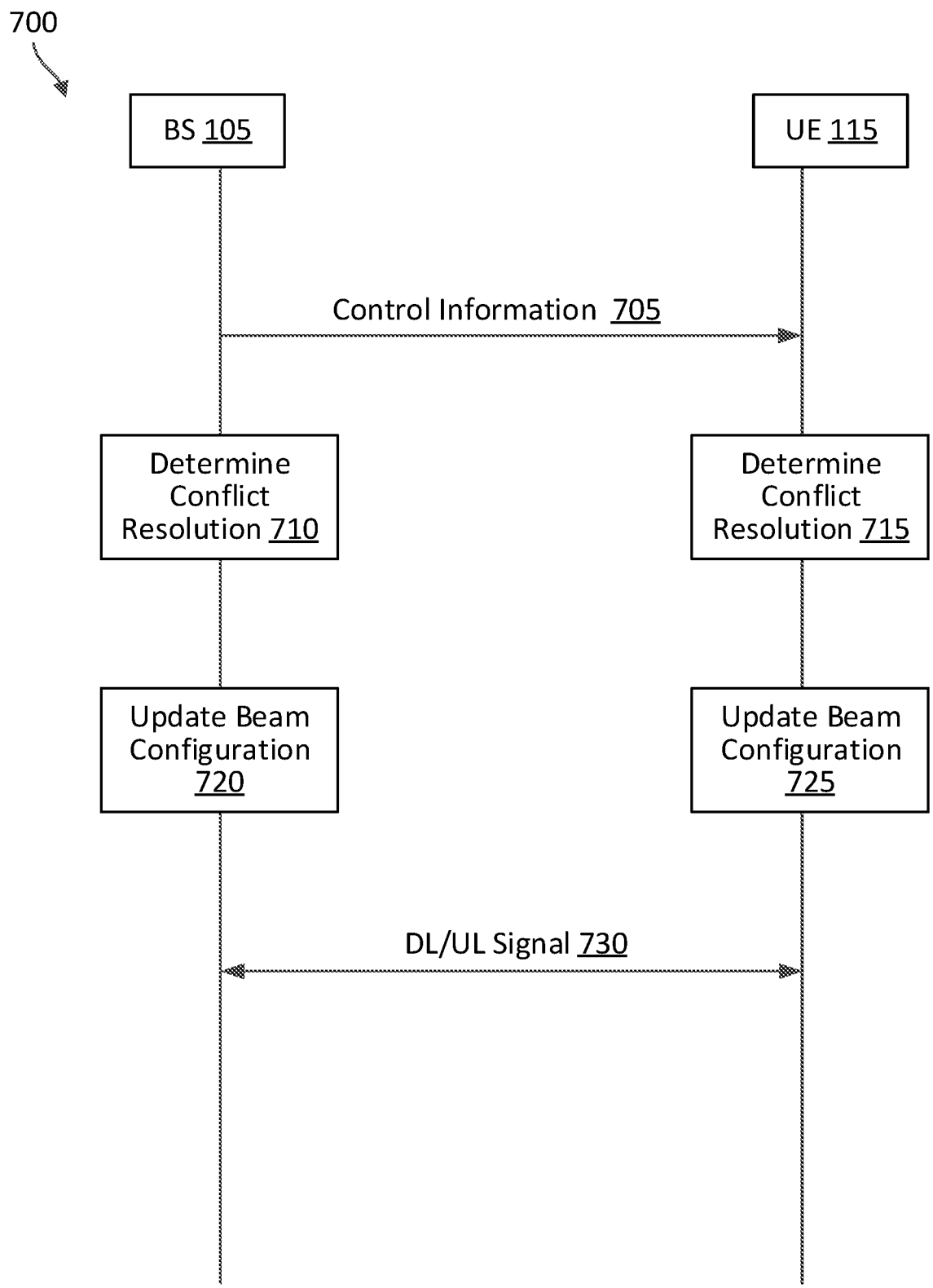
FIG. 7 illustrates an exemplary protocol diagram according to some aspects of the present disclosure.

FIG. 7 is a sequence diagram illustrating a communication protocol diagram 700 for resolving conflicting FD signals according to some aspects of the present disclosure. Aspects of the protocol diagram 700 may be performed by wireless networks, such as the networks 100 and/or 200. An additional BS 105 or UE 115 may perform the actions described in communication protocol diagram 700 when the network is in a configuration such as those illustrated in FIGS. 3A and 3B. For simplicity of illustration and discussion, communication protocol diagram 700 is illustrated with a single BS 105 and UE 115 which may perform functions of the communication protocol diagram 700. In some instances, the BS 105 may utilize TRPs (e.g., the TRPs 205) to communicate with the UE 115. the UE 115 may operate in FD mode and the BS 105 may operate in FD mode. In some instances, a single UE 115 may operate in FD mode communicating with two BSs 105 each operating in HD mode. In some instances, a single BS 105 may operate in FD mode communicating with two UEs 115 operating in HD mode.

In some aspects, the BS 105 may utilize one or more components, such as the processor 502, the memory 504, the conflict resolution module 508, the transceiver 510, the modem 512, and the one or more antennas 516 shown in FIG. 5, and the UE 115 may utilize one or more components, such as the processor 602, the memory 604, the conflict resolution module 608, the transceiver 610, the modem 612, and the one or more antennas 616 shown in FIG. 6. As illustrated, the method 700 includes a number of enumerated actions, but aspects of the FIG. 7 may include additional actions before, after, and in between the enumerated actions. In some aspects, one or more of the enumerated actions may be omitted or performed in a different order.

At action 705, the BS 105 may transmit control information to the UE 115. For example, this may be a DCI including scheduling information. A DCI may also include beam configuration information in order to avoid a conflict between incompatible beams.

At action 710, the BS 105 may determine a conflict resolution action. In some aspects, the conflict resolution action is determined before the control information is sent in action 705, as conflict resolution action information may be included in the control information. A conflict resolution action may also include dropping one of the conflicting signals. This may be determined based on a predefined rule. It may also be determined based on beam measurements and/or based on predetermined candidate beam pairs.

At action 715, the UE 115 may determine a conflict resolution action. This determination may be made independently of the BS 105 based on a predetermined rule. The determination may also be based on communication from the BS 105, such as an indication in the control information indicating to drop a signal or change a beam configuration.

At action 720, the BS 105 may update a beam configuration. In some aspects, this is not done if the conflict resolution action is to leave both signals unchanged, or to drop one of the signals.

At action 725, the UE 115 may update a beam configuration. In some aspects, no beam configurations are changed if the conflict resolution action is to leave both signals unchanged, or to drop one of the signals. In other aspects, the beam configuration information which is changed is based on information received in the control information communication 705. When the beam configuration information is associated with a periodic signal like SPS or CG, the beam configuration may be automatically changed with respect to the overlapped occasion of the SPS or CG signal.

At action 730, DL and UL signals are transmitted between the BS 105 and the UE 115 based on the conflict resolution action. If one of the signals is dropped as part of the conflict resolution action, then only the other signal is transmitted and received. If one or both of the beam configurations are changed as part of the conflict resolution action, then the signals are transmitted and received using the updated beam configurations. In some aspects, the beam configurations are already compatible, and so the conflict resolution action is to perform no action, and the signals are transmitted and received as is done normally.

Figure 8:
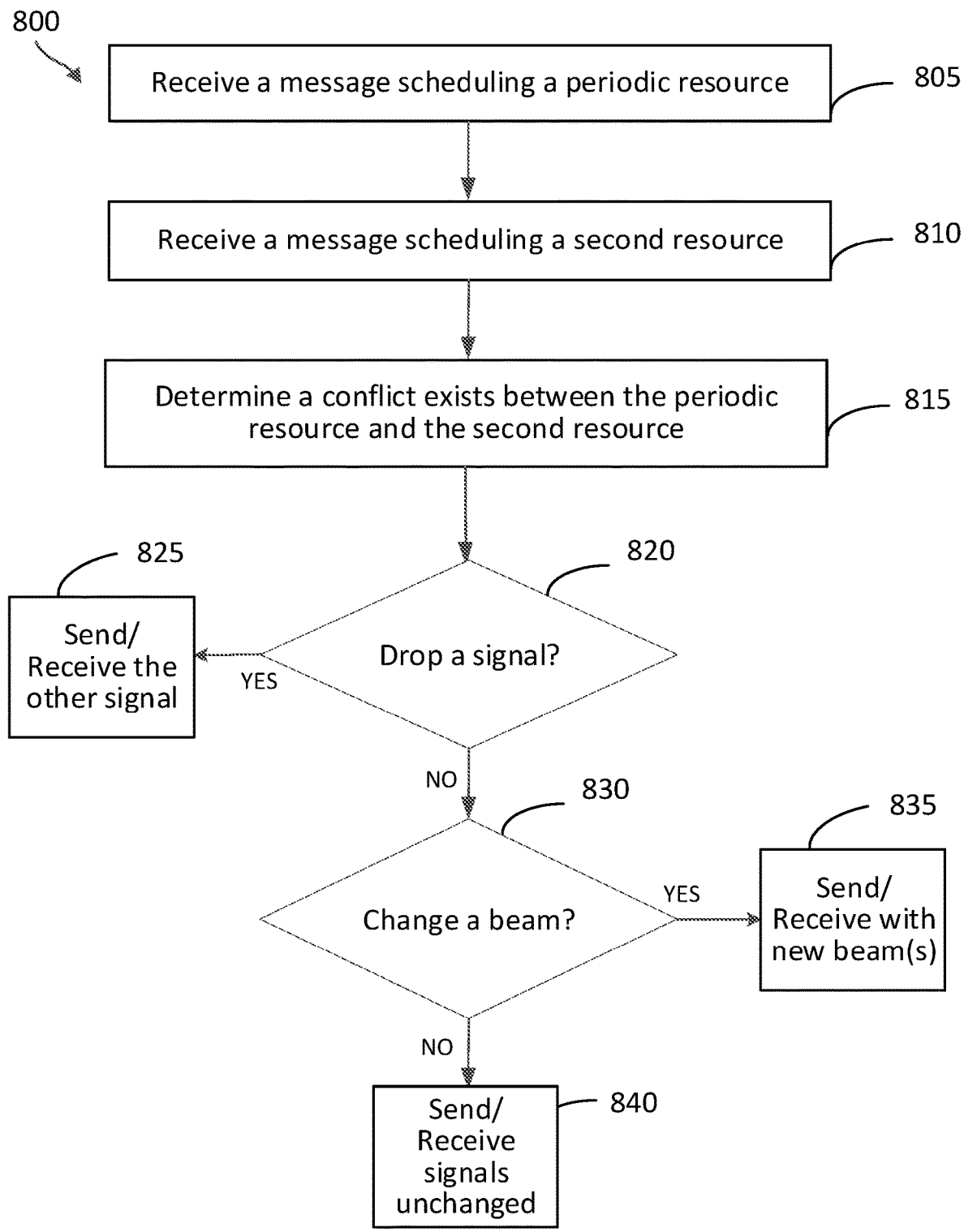
FIG. 8 illustrates an exemplary flow diagram of a wireless communication method according to some aspects of the present disclosure.

FIG. 8 is a flow diagram of a wireless communication method 800 according to some aspects of the present disclosure. Aspects of the method 800 can be executed by a computing device (e.g., a processor, processing circuit, and/or other suitable component) of a wireless communication device or other suitable means for performing the steps. For example, a UE 115 may utilize one or more components, such as the processor 602, the memory 604, the conflict resolution module 608, the transceiver 610, the modem 612, and the one or more antennas 616 shown in FIG. 6. As illustrated, the method 800 includes a number of enumerated steps, but aspects of the method 800 may include additional steps before, after, and in between the enumerated steps. In some aspects, one or more of the enumerated steps may be omitted or performed in a different order.

At block 805, a UE 115 may receive a message scheduling a periodic resource. For example, this may be a CG UL resource, or a SPS DL resource. The resources may be configured using specific beam configurations (TCI states).

At block 810, a UE 115 may receive a message scheduling a second resource. This may be, for example, a resource for a CSI-RS, or for a SRS. The second resource may be periodic or aperiodic. In some aspects, when the second resource is aperiodic, the message scheduling the second resource is a DCI message.

At block 815, a UE 115 may determine a conflict exists between the periodic resource and the second resource. This determination may be explicit or implicit. For example, a BS 105 may indicate to the UE 115 to drop an occasion of the periodic resource, which is a conflict resolution action, but it does not require an explicit determination by the UE that there is a conflict in order for the UE to perform the indicated action.

At decision block 820, a UE 115 may determine a conflict resolution action. If the conflict resolution action is to drop one of the signals, method 800 proceeds to block 825. If a signal is not dropped, method 800 continues to block 830. Decision blocks 820 and 830 may be performed in any combination, including simultaneously, or performing one and not the other.

At block 825, a UE 115 may send or receive the signal which was not dropped as part of the conflict resolution action.

At decision block 830, a UE 115 may determine whether to change one or both beam configurations. This determination may be based on receiving an indication in the scheduling DCI of a new beam configuration for one or both of the conflicting signals. If a beam is changed, method 800 continues to block 835. If no beams are changed, method 800 continues to block 840.

As noted above, decision blocks 820 and 830 may be performed in any combination, including performing one and not the other, or both together. Thus, in some examples the UE 115 may determine whether a conflict resolution action is to drop one of the signals (decision block 820, branching to either block 825 or decision block 830), but not perform decision block 830. In that alternative, the method 800 proceeds from decision block 820 (on the "no" branch) to block 840, bypassing decision block 830. As another example, the UE 115 may proceed from block 815 to decision block 830, bypassing decision block 820. As yet another example, the UE 115 may perform both decision blocks 820 and 830 as illustrated.

At block 835, a UE 115 may transmit and receive the signals using the updated beam configurations.

At block 840, a UE 115 may transmit and receive the unchanged signals. In some aspects, the UE 115 determines that no change is needed when the beams associated with the resources are compatible based on previous measurements and/or the beams are in a list of preconfigured candidate beam pairs.

Figure 9:
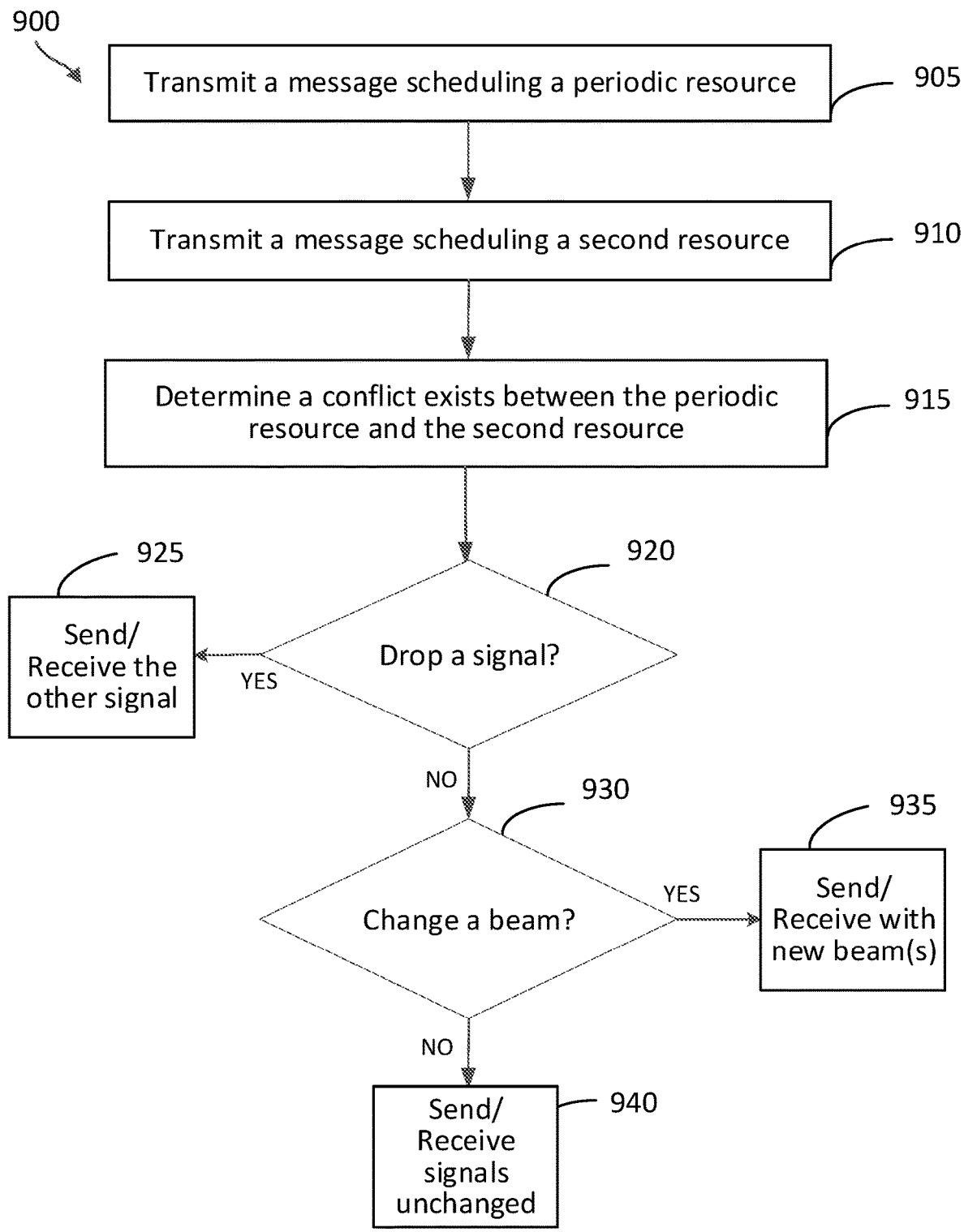
FIG. 9 illustrates an exemplary flow diagram of a wireless communication method according to some aspects of the present disclosure.

FIG. 9 is a flow diagram of a wireless communication method 900 according to some aspects of the present disclosure. Aspects of the method 900 can be executed by a computing device (e.g., a processor, processing circuit, and/or other suitable component) of a wireless communication device or other suitable means for performing the steps. For example, a BS 105 may utilize one or more components, such as the processor 502, the memory 504, the conflict resolution module 508, the transceiver 510, the modem 512, and the one or more antennas 516 shown in FIG. 5. As illustrated, the method 900 includes a number of enumerated steps, but aspects of the method 900 may include additional steps before, after, and in between the enumerated steps. In some aspects, one or more of the enumerated steps may be omitted or performed in a different order.

At block 905, a BS 105 may transmit a message scheduling a periodic resource. For example, this may be a CG UL resource, or a SPS DL resource. The resources may be configured using specific beam configurations (TCI states).

At block 910, a BS 105 may transmit a message scheduling a second resource. This may be, for example, a resource for a CSI-RS, or for a SRS. The second resource may be periodic or aperiodic. In some aspects, when the second resource is aperiodic, the message scheduling the second resource is a DCI message.

At block 915, a BS 105 may determine a conflict exists between the periodic resource and the second resource. This determination may be performed before transmitting the message scheduling the second resource. This allows the BS 105 to include information in the scheduling message such as an indication to drop one of the signals, or to change one or both of the beam configurations.

At decision block 920, a BS 105 may determine a conflict resolution action. If the conflict resolution action is to drop one of the signals, method 900 proceeds to block 925. If a signal is not dropped, method 900 continues to block 930. Decision blocks 920 and 930 may be performed in any combination, including simultaneously, or performing one and not the other.

At block 925, a BS 105 may send or receive the signal which was not dropped as part of the conflict resolution action.

At decision block 930, a BS 105 may determine whether to change one or both beam configurations. This determination may be based on receiving an indication in the scheduling DCI of a new beam configuration for one or both of the conflicting signals. If a beam is changed, method 900 continues to block 935. If no beams are changed, method 900 continues to block 940.

As noted above, decision blocks 920 and 930 may be performed in any combination, including performing one and not the other, or both together. Thus, in some examples the BS 105 may determine whether a conflict resolution action is to drop one of the signals (decision block 920, branching to either block 925 or decision block 930), but not perform decision block 930. In that alternative, the method 900 proceeds from decision block 920 (on the "no" branch) to block 940, bypassing decision block 930. As another example, the BS 105 may proceed from block 915 to decision block 930, bypassing decision block 920. As yet another example, the BS 105 may perform both decision blocks 920 and 930 as illustrated.

At block 935, a BS 105 may transmit and receive the signals using the updated beam configurations.

At block 940, a BS 105 may transmit and receive the unchanged signals. In some aspects, the BS 105 determines that no change is needed when the beams associated with the resources are compatible based on previous measurements and/or the beams are in a list of preconfigured candidate beam pairs.

Further aspects of the present disclosure include the following:

1. A first wireless communication device, comprising:
a transceiver configured to communicate, with a second wireless communication device, control information indicating a downlink (DL) resource for a first signal; and
a processor configured to perform a conflict resolution action associated with at least one of the DL resource and a configured grant (CG) resource for a second signal in response to the DL resource at least partially overlapping the CG resource in time,
wherein the transceiver is further configured to communicate, in response to the performing the conflict resolution action, at least one of the first signal or the second signal with the second wireless communication device.

2. The first wireless communication device of aspect 1, wherein:
the DL resource is periodic,
the conflict resolution action is based on a rule to drop the first signal, and
the transceiver is further configured, for the communication of the at least one of the first signal or the second signal, to communicate the second signal in response to dropping the first signal.

3. The first wireless communication device of aspect 1, wherein:
the DL resource is periodic,
the conflict resolution action is based on a rule to drop at least a portion of the second signal, and
the transceiver is further configured, for the communication of the at least one of the first signal or the second signal, to communicate the first signal in response to dropping the at least portion of the second signal.

4. The first wireless communication device of aspect 1, wherein:
the DL resource is periodic,
the conflict resolution action is based on a rule to change a beam configuration associated with the DL resource to a first beam configuration that is compatible with a second beam configuration associated with the CG resource for simultaneous transmission and reception in full duplex communication mode, and
the transceiver is further configured, for the communication of the at least one of the first signal or the second signal, to communicate the first signal with the changed first beam configuration, and communicate the second signal using the CG resource with the second beam configuration.

5. The first wireless communication device of aspect 1, wherein:
the DL resource is periodic,
the conflict resolution action is based on a rule to change a beam configuration associated with the CG resource to a second beam configuration that is compatible with a first beam configuration associated with the DL resource, and
the transceiver is further configured, for the communication of the at least one of the first signal or the second signal, to communicate the second signal using the CG resource with the changed second beam configuration, and communicate the first signal using the DL resource with the first beam configuration.

6. The first wireless communication device of aspect 1, wherein:
the DL resource is aperiodic,
the conflict resolution action is based on a rule to apply a beam configuration to the CG resource, the beam configuration being based on an indication obtained from a new or repurposed field included in the control information that schedules the first signal, and
the transceiver is further configured, for the communication of the at least one of the first signal or the second signal, to communicate the second signal using the CG resource with the indicated beam configuration, and the first signal using the DL resource.

7. The first wireless communication device of aspect 1, wherein:
the DL resource is aperiodic,
the conflict resolution action is based on a rule to drop at least a portion of the second signal based on an indication obtained from a field included in the control information that schedules the first signal, and
the transceiver is further configured, for the communication of the at least one of the first signal or the second signal, to communicate the first signal in response to dropping the at least portion of the second signal.

8. The first wireless communication device of aspect 1, wherein the DL resource is aperiodic and the processor is further configured to:
determine whether the first signal with a first beam configuration applied to the DL resource is compatible with the second signal with a second beam configuration applied to the CG resource for simultaneous transmission and reception in full duplex communication mode,
wherein the conflict resolution action is based on a rule to drop at least a portion of the second signal in response to the first signal with the first beam configuration not being compatible with the second signal with the second beam configuration, and
the transceiver is further configured, for the communication of the at least one of the first signal or the second signal, to communicate the first signal and drop the at least portion of the second signal in response to determining that the first signal is incompatible with the second signal.

9. The first wireless communication device of aspect 1, wherein:
the DL resource is aperiodic,
the conflict resolution action is based on a rule to drop at least a portion of the second signal, and
the transceiver is further configured, for the communication of the at least one of the first signal or the second signal, to communicate the first signal.

10. The first wireless communication device of aspect 1, wherein:
the DL resource is aperiodic,
the conflict resolution action is based on a rule to change a first beam configuration associated with the DL resource and a second beam configuration associated with the CG resource based on information included in a bi-directional transmission configuration indicator (TCI) state for full duplex mode field of the control information, the first and second beam configurations being compatible with each other, and
the transceiver is further configured, for the communication of the at least one of the first signal or the second signal, to communicate the first signal using the first beam configuration and communicate the second signal using the second beam configuration.

11. The first wireless communication device of aspect 1, wherein:
the DL resource is aperiodic,
the conflict resolution action is based on a rule to change a beam configuration associated with the DL resource to a first beam configuration that is compatible with a second beam configuration associated with the CG resource, based on previous beam measurements or pre-configured candidate beam pairs, and
the transceiver is further configured, for the communication of the at least one of the first signal or the second signal, to communicate the first signal with the DL resource with the changed first beam configuration and communicate the second signal using the CG resource with the second beam configuration.

12. The first wireless communication device of aspect 1, wherein:
the DL resource is aperiodic,
the conflict resolution action is based on a rule to change a beam configuration associated with the CG resource to a second beam configuration that is compatible with a first beam configuration associated with the DL resource, based on previous beam measurements or pre-configured candidate beam pairs, and
the transceiver is further configured, for the communication of the at least one of the first signal or the second signal, to communicate the first signal using the DL resource with the first beam configuration and communicate the second signal using the CG resource with the changed second beam configuration.

13. The first wireless communication device of any of aspects 1-12, wherein:
the first wireless communication device comprises a user equipment (UE),
the second wireless communication device comprises a base station, and
the transceiver is further configured, for the communication of the control information, to receive the control information from the second wireless communication device.

14. The first wireless communication device of any of aspects 1-12, wherein:
the first wireless communication device comprises a base station,
the second wireless communication device comprises a user equipment (UE), and
the transceiver is further configured, for the communication of the control information, to transmit the control information to the second wireless communication device.

15. The first wireless communication device of any of aspects 1-14, wherein:
the DL resource is a channel state information reference signal (CSI-RS) resource.

16. A first wireless communication device, comprising:
a transceiver configured to communicate, with a second wireless communication device, control information indicating an uplink (UL) resource for a first signal; and
a processor configured to perform a conflict resolution action associated with at least one of the UL resource and a semi-persistent scheduling (SPS) resource for a second signal in response to the UL resource at least partially overlapping the SPS resource in time,
wherein the transceiver is further configured to communicate, in response to the performing the conflict resolution action, at least one of the first signal or the second signal with the second wireless communication device.

17. The first wireless communication device of aspect 16, wherein:
the UL resource is periodic,
the conflict resolution action is based on a rule to drop the first signal, and
the transceiver is further configured, for the communication of the at least one of the first signal or the second signal, to communicate the second signal in response to dropping the first signal.

18. The first wireless communication device of aspect 16, wherein:
the UL resource is periodic,
the conflict resolution action is based on a rule to drop at least a portion of the second signal, and
the transceiver is further configured, for the communication of the at least one of the first signal or the second signal, to communicate the first signal in response to dropping the at least portion of the second signal.

19. The first wireless communication device of aspect 16, wherein:
the UL resource is periodic,
the conflict resolution action is based on a rule to change a beam configuration associated with the UL resource to a first beam configuration that is compatible with a second beam configuration associated with the SPS resource for simultaneous transmission and reception in full duplex communication mode, and
the transceiver is further configured, for the communication of the at least one of the first signal or the second signal, to communicate the first signal with the changed first beam configuration, and communicate the second signal using the SPS resource with the second beam configuration.

20. The first wireless communication device of aspect 16, wherein:
the UL resource is periodic,
the conflict resolution action is based on a rule to change a beam configuration associated with the SPS resource to a second beam configuration that is compatible with a first beam configuration associated with the UL resource, and
the transceiver is further configured, for the communication of the at least one of the first signal or the second signal, to communicate the second signal using the SPS resource with the changed second beam configuration, and communicate the first signal using the UL resource with the first beam configuration.

21. The first wireless communication device of aspect 16, wherein:
the UL resource is aperiodic,
the conflict resolution action is based on a rule to apply a beam configuration to the SPS resource, the beam configuration being based on an indication obtained from a new or repurposed field included in the control information that schedules the first signal, and
the transceiver is further configured, for the communication of the at least one of the first signal or the second signal, to communicate the second signal using the SPS resource with the indicated beam configuration, and the first signal using the UL resource.

22. The first wireless communication device of aspect 16, wherein:
the UL resource is aperiodic,
the conflict resolution action is based on a rule to drop at least a portion of the second signal based on an indication obtained from a field included in the control information that schedules the first signal, and
the transceiver is further configured, for the communication of the at least one of the first signal or the second signal, to communicate the first signal in response to dropping the at least portion of the second signal.

23. The first wireless communication device of aspect 16, wherein the UL resource is aperiodic, and the processor is further configured to:
determine whether the first signal with a first beam configuration applied to the UL resource is compatible with the second signal with a second beam configuration applied to the SPS resource for simultaneous transmission and reception in full duplex communication mode,
wherein the conflict resolution action is based on a rule to drop at least a portion of the second signal in response to the first signal with the first beam configuration not being compatible with the second signal with the second beam configuration, and
the transceiver is further configured, for the communication of the at least one of the first signal or the second signal, to communicate the first signal and dropping the at least portion of the second signal in response to determining that the first signal is incompatible with the second signal.

24. The first wireless communication device of aspect 16, wherein:
the UL resource is aperiodic,
the conflict resolution action is based on a rule to drop at least a portion of the second signal, and
the transceiver is further configured, for the communication of the at least one of the first signal or the second signal, to communicate the first signal.

25. The first wireless communication device of aspect 16, wherein:
the UL resource is aperiodic,
the conflict resolution action is based on a rule to change a first beam configuration associated with the UL resource and a second beam configuration associated with the SPS resource based on information included in a bi-directional transmission configuration indicator (TCI) state for full duplex mode field of the control information, the first and second beam configurations being compatible with each other, and
the transceiver is further configured, for the communication of the at least one of the first signal or the second signal, to communicate the first signal using the first beam configuration and communicate the second signal using the second beam configuration.

26. The first wireless communication device of aspect 16, wherein:
the UL resource is aperiodic,
the conflict resolution action is based on a rule to change a beam configuration associated with the UL resource to a first beam configuration that is compatible with a second beam configuration associated with the SPS resource, based on previous beam measurements or pre-configured candidate beam pairs, and
the transceiver is further configured, for the communication of the at least one of the first signal or the second signal, to communicate the first signal with the UL resource with the changed first beam configuration and communicate the second signal using the SPS resource with the second beam configuration.

27. The first wireless communication device of aspect 16, wherein:
the UL resource is aperiodic,
the conflict resolution action is based on a rule to change a beam configuration associated with the SPS resource to a second beam configuration that is compatible with a first beam configuration associated with the UL resource, based on previous beam measurements or pre-configured candidate beam pairs, and the transceiver is further configured, for the communication of the at least one of the first signal or the second signal, to communicate the first signal using the UL resource with the first beam configuration and communicate the second signal using the SPS resource with the changed second beam configuration.

28. The first wireless communication device of any of aspects 16-27, wherein:

the first wireless communication device comprises a user equipment (UE), the second wireless communication device comprises a base station, and the transceiver is further configured, for the communication of the control information, to receive the control information from the second wireless communication device.

29. The first wireless communication device of any of aspects 16-27, wherein:

the first wireless communication device comprises a base station, the second wireless communication device comprises a user equipment (UE), and the transceiver is further configured, for the communication of the control information, to transmit the control information to the second wireless communication device.

30. The first wireless communication device of any of aspects 16-29, wherein:

the UL resource is a sounding reference signal (SRS) resource.

31. A method of wireless communication comprising:

communicating, between a first wireless communication device and a second wireless communication device, control information indicating a downlink (DL) resource for a first signal;

performing, by the first wireless communication device, a conflict resolution action associated with at least one of the DL resource and a configured grant (CG) resource for a second signal in response to the DL resource at least partially overlapping the CG resource in time; and communicating, in response to the performing the conflict resolution action, at least one of the first signal or the second signal between the first wireless communication device and the second wireless communication device.

32. The method of aspect 31, wherein:

the DL resource is periodic, the conflict resolution action is based on a rule to drop the first signal, and the communicating the at least one of the first signal or the second signal comprises communicating the second signal in response to dropping the first signal.

33. The method of aspect 31, wherein:

the DL resource is periodic, the conflict resolution action is based on a rule to drop at least a portion of the second signal, and the communicating the at least one of the first signal or the second signal comprises communicating the first signal in response to dropping the at least portion of the second signal.

34. The method of aspect 31, wherein:

the DL resource is periodic, the conflict resolution action is based on a rule to change a beam configuration associated with the DL resource to a first beam configuration that is compatible with a second beam configuration associated with the CG resource for simultaneous transmission and reception in full duplex communication mode, and the communicating the at least one of the first signal or the second signal comprises communicating the first signal with the changed first beam configuration, and communicating the second signal using the CG resource with the second beam configuration.

35. The method of aspect 31, wherein:

the DL resource is periodic, the conflict resolution action is based on a rule to change a beam configuration associated with the CG resource to a second beam configuration that is compatible with a first beam configuration associated with the DL resource, and the communicating the at least one of the first signal or the second signal comprises communicating the second signal using the CG resource with the changed second beam configuration, and communicating the first signal using the DL resource with the first beam configuration.

36. The method of aspect 31, wherein:

the DL resource is aperiodic, the conflict resolution action is based on a rule to apply a beam configuration to the CG resource, the beam configuration being based on an indication obtained from a new or repurposed field included in the control information that schedules the first signal, and the communicating the at least one of the first signal or the second signal comprises communicating the second signal using the CG resource with the indicated beam configuration, and the first signal using the DL resource.

37. The method of aspect 31, wherein:

the DL resource is aperiodic, the conflict resolution action is based on a rule to drop at least a portion of the second signal based on an indication obtained from a field included in the control information that schedules the first signal, and the communicating the at least one of the first signal or the second signal comprises communicating the first signal in response to dropping the at least portion of the second signal.

38. The method of aspect 31, wherein the DL resource is aperiodic, further comprising:

determining whether the first signal with a first beam configuration applied to the DL resource is compatible with the second signal with a second beam configuration applied to the CG resource for simultaneous transmission and reception in full duplex communication mode, wherein:

the conflict resolution action is based on a rule to drop at least a portion of the second signal in response to the first signal with the first beam configuration not being compatible with the second signal with the second beam configuration, and the communicating the at least one of the first signal or the second signal comprises communicating the first signal and dropping the at least portion of the second signal in response to determining that the first signal is incompatible with the second signal.

39. The method of aspect 31, wherein:

the DL resource is aperiodic, the conflict resolution action is based on a rule to drop at least a portion of the second signal, and the communicating the at least one of the first signal or the second signal comprises communicating the first signal.

40. The method of aspect 31, wherein:

the DL resource is aperiodic, the conflict resolution action is based on a rule to change a first beam configuration associated with the DL resource and a second beam configuration associated with the CG resource based on information included in a bi-directional transmission configuration indicator (TCI) state for full duplex mode field of the control information, the first and second beam configurations being compatible with each other, and the communicating the at least one of the first signal or the second signal comprises communicating the first signal using the first beam configuration and communicating the second signal using the second beam configuration.

41. The method of aspect 31, wherein:
the DL resource is aperiodic,
the conflict resolution action is based on a rule to change a beam configuration associated with the DL resource to a first beam configuration that is compatible with a second beam configuration associated with the CG resource, based on previous beam measurements or pre-configured candidate beam pairs, and
the communicating the at least one of the first signal or the second signal comprises communicating the first signal with the DL resource with the changed first beam configuration and communicating the second signal using the CG resource with the second beam configuration.

42. The method of aspect 31, wherein:
the DL resource is aperiodic,
the conflict resolution action is based on a rule to change a beam configuration associated with the CG resource to a second beam configuration that is compatible with a first beam configuration associated with the DL resource, based on previous beam measurements or pre-configured candidate beam pairs, and
the communicating the at least one of the first signal or the second signal comprises communicating the first signal using the DL resource with the first beam configuration and communicating the second signal using the CG resource with the changed second beam configuration.

43. The method of any of aspects 31-42, wherein:
the first wireless communication device comprises a user equipment (UE),
the second wireless communication device comprises a base station, and
the communicating the control information comprises communicating from the base station to the UE.

44. The method of any of aspects 31-42, wherein:
the first wireless communication device comprises a base station,
the second wireless communication device comprises a user equipment (UE), and
the communicating the control information comprises communicating from the base station to the UE.

45. The method of any of aspects 31-44, wherein:
The DL resource is a channel state information reference signal (CSI-RS) resource.

46. A method of wireless communication comprising:
communicating, between a first wireless communication device and a second wireless communication device, control information indicating an uplink (UL) resource for a first signal;
performing, by the first wireless communication device, a conflict resolution action associated with at least one of the UL resource and a semi-persistent scheduling (SPS) resource for a second signal in response to the UL resource at least partially overlapping the SPS resource in time; and
communicating, in response to the performing the conflict resolution action, at least one of the first signal or the second signal between the first wireless communication device and the second wireless communication device.

47. The method of aspect 46, wherein:
the UL resource is periodic,
the conflict resolution action is based on a rule to drop the first signal, and
the communicating the at least one of the first signal or the second signal comprises communicating the second signal in response to dropping the first signal.

48. The method of aspect 46, wherein:
the UL resource is periodic,
the conflict resolution action is based on a rule to drop at least a portion of the second signal, and
the communicating the at least one of the first signal or the second signal comprises communicating the first signal in response to dropping the at least portion of the second signal.

49. The method of aspect 46, wherein:
the UL resource is periodic,
the conflict resolution action is based on a rule to change a beam configuration associated with the UL resource to a first beam configuration that is compatible with a second beam configuration associated with the SPS resource for simultaneous transmission and reception in full duplex communication mode, and
the communicating the at least one of the first signal or the second signal comprises communicating the first signal with the changed first beam configuration, and communicating the second signal using the SPS resource with the second beam configuration.

50. The method of aspect 46, wherein:
the UL resource is periodic,
the conflict resolution action is based on a rule to change a beam configuration associated with the SPS resource to a second beam configuration that is compatible with a first beam configuration associated with the UL resource, and
the communicating the at least one of the first signal or the second signal comprises communicating the second signal using the SPS resource with the changed second beam configuration, and communicating the first signal using the UL resource with the first beam configuration.

51. The method of aspect 46, wherein:
the UL resource is aperiodic,
the conflict resolution action is based on a rule to apply a beam configuration to the SPS resource, the beam configuration being based on an indication obtained from a new or repurposed field included in the control information that schedules the first signal, and
the communicating the at least one of the first signal or the second signal comprises communicating the second signal using the SPS resource with the indicated beam configuration, and the first signal using the UL resource.

52. The method of aspect 46, wherein:
the UL resource is aperiodic,
the conflict resolution action is based on a rule to drop at least a portion of the second signal based on an indication obtained from a field included in the control information that schedules the first signal, and
the communicating the at least one of the first signal or the second signal comprises communicating the first signal in response to dropping the at least portion of the second signal.

53. The method of aspect 46, wherein the UL resource is aperiodic, further comprising:
determining whether the first signal with a first beam configuration applied to the UL resource is compatible with the second signal with a second beam configuration applied to the SPS resource for simultaneous transmission and reception in full duplex communication mode, wherein:

the conflict resolution action is based on a rule to drop at least a portion of the second signal in response to the first signal with the first beam configuration not being compatible with the second signal with the second beam configuration, and the communicating the at least one of the first signal or the second signal comprises communicating the first signal and dropping the at least portion of the second signal in response to determining that the first signal is incompatible with the second signal.

54. The method of aspect 46, wherein:
the UL resource is aperiodic,
the conflict resolution action is based on a rule to drop at least a portion of the second signal, and
the communicating the at least one of the first signal or the second signal comprises communicating the first signal.

55. The method of aspect 46, wherein:
the UL resource is aperiodic,
the conflict resolution action is based on a rule to change a first beam configuration associated with the UL resource and a second beam configuration associated with the SPS resource based on information included in a bi-directional transmission configuration indicator (TCI) state for full duplex mode field of the control information, the first and second beam configurations being compatible with each other, and
the communicating the at least one of the first signal or the second signal comprises communicating the first signal using the first beam configuration and communicating the second signal using the second beam configuration.

56. The method of aspect 46, wherein:
the UL resource is aperiodic,
the conflict resolution action is based on a rule to change a beam configuration associated with the UL resource to a first beam configuration that is compatible with a second beam configuration associated with the SPS resource, based on previous beam measurements or pre-configured candidate beam pairs, and
the communicating the at least one of the first signal or the second signal comprises communicating the first signal with the UL resource with the changed first beam configuration and communicating the second signal using the SPS resource with the second beam configuration.

57. The method of aspect 46, wherein:
the UL resource is aperiodic,
the conflict resolution action is based on a rule to change a beam configuration associated with the SPS resource to a second beam configuration that is compatible with a first beam configuration associated with the UL resource, based on previous beam measurements or pre-configured candidate beam pairs, and
the communicating the at least one of the first signal or the second signal comprises communicating the first signal using the UL resource with the first beam configuration and communicating the second signal using the SPS resource with the changed second beam configuration.

58. The method of any of aspects 46-57, wherein:
the first wireless communication device comprises a user equipment (UE),
the second wireless communication device comprises a base station, and
the communicating the control information comprises communicating from the base station to the UE.

59. The method of any of aspects 46-57, wherein:
the first wireless communication device comprises a base station, the second wireless communication device comprises a user equipment (UE), and
the communicating the control information comprises communicating from the base station to the UE.

60. The method of any of aspects 46-59, wherein:
The UL resource is a sounding reference signal (SRS) resource.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:
1. A first wireless communication device, comprising: one or more memories; and one or more processors coupled to the one or more memories, the one or more memories storing instructions that are executable by the one or more processors, individually or in any combination, to cause the first wireless communication device to: communicate, with a second wireless communication device, control information indicating a downlink (DL) resource for a first signal using a first beam; communicate, with the second wireless communication device, control information indicating a configured grant (CG) uplink (UL) resource for a second signal using a second beam, the CG UL resource at least partially overlapping the DL resource in time; perform a conflict resolution action, associated with at least one of the DL resource and the CG UL resource in response to the DL resource at least partially overlapping the CG UL resource in time, and the first beam being incompatible with the second beam based on a periodic beam management measurement; and communicate, in response to the performing the conflict resolution action, at least one of the first signal or the second signal with the second wireless communication device.

2. The first wireless communication device of claim 1, wherein: the DL resource is periodic, the conflict resolution action is based on a rule to drop the first signal, and the one or more processors are further configured to cause the first wireless communication device, for the communication of the at least one of the first signal or the second signal, to communicate the second signal in response to dropping the first signal.

3. The first wireless communication device of claim 1, wherein: the DL resource is periodic, the conflict resolution action is based on a rule to drop at least a portion of the second signal, and the one or more processors are further configured to cause the first wireless communication device, for the communication of the at least one of the first signal or the second signal, to communicate the first signal in response to dropping the at least portion of the second signal.

4. The first wireless communication device of claim 1, wherein: the DL resource is periodic, the conflict resolution action is based on a rule to change a beam configuration associated with the DL resource to a first beam configuration that is compatible with a second beam configuration associated with the CG UL resource for simultaneous transmission and reception in full duplex communication mode, and the one or more processors are further configured to cause the first wireless communication device, for the communication of the at least one of the first signal or the second signal, to communicate the first signal with the changed first beam configuration, and communicate the second signal using the CG UL resource with the second beam configuration.

5. The first wireless communication device of claim 1, wherein: the DL resource is periodic, the conflict resolution action is based on a rule to change a beam configuration associated with the CG UL resource to a second beam configuration that is compatible with a first beam configuration associated with the DL resource, and the one or more processors are further configured to cause the first wireless communication device, for the communication of the at least one of the first signal or the second signal, to communicate the second signal using the CG UL resource with the changed second beam configuration, and communicate the first signal using the DL resource with the first beam configuration.

6. The first wireless communication device of claim 1, wherein: the DL resource is aperiodic, the conflict resolution action is based on a rule to apply a beam configuration to the CG UL resource, the beam configuration being based on an indication obtained from a new or repurposed field included in the control information that schedules the first signal, and the one or more processors are further configured to cause the first wireless communication device, for the communication of the at least one of the first signal or the second signal, to communicate the second signal using the CG UL resource with the indicated beam configuration, and the first signal using the DL resource.

7. The first wireless communication device of claim 1, wherein: the DL resource is aperiodic, the conflict resolution action is based on a rule to drop at least a portion of the second signal based on an indication obtained from a field included in the control information that schedules the first signal, and the one or more processors are further configured to cause the first wireless communication device, for the communication of the at least one of the first signal or the second signal, to communicate the first signal in response to dropping the at least portion of the second signal.

8. The first wireless communication device of claim 1, wherein the DL resource is aperiodic and the one or more processors are further configured to cause the first wireless communication device to: determine whether the first signal with a first beam configuration applied to the DL resource is compatible with the second signal with a second beam configuration applied to the CG UL resource for simultaneous transmission and reception in full duplex communication mode, wherein the conflict resolution action is based on a rule to drop at least a portion of the second signal in response to the first signal with the first beam configuration not being compatible with the second signal with the second beam configuration, and the one or more processors are further configured to cause the first wireless communication device, for the communication of the at least one of the first signal or the second signal, to communicate the first signal and drop the at least portion of the second signal in response to determining that the first signal is incompatible with the second signal.

9. The first wireless communication device of claim 1, wherein: the DL resource is aperiodic, the conflict resolution action is based on a rule to drop at least a portion of the second signal, and the one or more processors are further configured to cause the first wireless communication device, for the communication of the at least one of the first signal or the second signal, to communicate the first signal.

10. The first wireless communication device of claim 1, wherein: the DL resource is aperiodic, the conflict resolution action is based on a rule to change a first beam configuration associated with the DL resource and a second beam configuration associated with the CG UL resource based on information included in a bi-directional transmission configuration indicator (TCI) state for full duplex mode field of the control information, the first and second beam configurations being compatible with each other, and the one or more processors are further configured to cause the first wireless communication device, for the communication of the at least one of the first signal or the second signal, to communicate the first signal using the first beam configuration and communicate the second signal using the second beam configuration.

11. The first wireless communication device of claim 1, wherein: the DL resource is aperiodic, the conflict resolution action is based on a rule to change a beam configuration associated with the DL resource to a first beam configuration that is compatible with a second beam configuration associated with the CG UL resource, based on previous beam measurements or pre-configured candidate beam pairs, and the one or more processors are further configured to cause the first wireless communication device, for the communication of the at least one of the first signal or the second signal, to communicate the first signal with the DL resource with the changed first beam configuration and communicate the second signal using the CG UL resource with the second beam configuration.

12. The first wireless communication device of claim 1, wherein: the DL resource is aperiodic, the conflict resolution action is based on a rule to change a beam configuration associated with the CG UL resource to a second beam configuration that is compatible with a first beam configuration associated with the DL resource, based on previous beam measurements or pre-configured candidate beam pairs, and the one or more processors are further configured to cause the first wireless communication device, for the communication of the at least one of the first signal or the second signal, to communicate the first signal using the DL resource with the first beam configuration and communicate the second signal using the CG UL resource with the changed second beam configuration.

13. The first wireless communication device of claim 1, wherein: the first wireless communication device comprises a user equipment (UE), the second wireless communication device comprises a base station, and the one or more processors are further configured to cause the first wireless communication device, for the communication of the control information, to receive the control information from the second wireless communication device.

14. The first wireless communication device of claim 1, wherein: the first wireless communication device comprises a base station, the second wireless communication device comprises a user equipment (UE), and the one or more processors are further configured to cause the first wireless communication device, for the communication of the control information, to transmit the control information to the second wireless communication device.

15. The first wireless communication device of claim 1, wherein: the DL resource is a channel state information reference signal (CSI-RS) resource.

16. A method of wireless communication performed by a first wireless communication device, the method comprising: communicating, with a second wireless communication device, control information indicating a downlink (DL) resource for a first signal using a first beam; communicate, with the second wireless communication device, control information indicating a configured grant (CG) uplink (UL) resource for a second signal using a second beam, the CG UL resource at least partially overlapping the DL resource in time; performing a conflict resolution action, associated with at least one of the DL resource and the CG UL resource in response to the DL resource at least partially overlapping the CG UL resource in time, and the first beam being incompatible with the second beam based on a periodic beam management measurement; and communicating, in response to the performing the conflict resolution action, at least one of the first signal or the second signal with the second wireless communication device.

17. The method of claim 16, wherein: the DL resource is periodic, the conflict resolution action is based on a rule to drop the first signal, and the communication of the at least one of the first signal or the second signal includes communicating the second signal in response to dropping the first signal.

18. The method of claim 16, wherein: the DL resource is periodic, the conflict resolution action is based on a rule to drop at least a portion of the second signal, and the communication of the at least one of the first signal or the second signal includes communicating the first signal in response to dropping the at least portion of the second signal.

19. The method of claim 16, wherein: the DL resource is periodic, the conflict resolution action is based on a rule to change a beam configuration associated with the DL resource to a first beam configuration that is compatible with a second beam configuration associated with the CG UL resource for simultaneous transmission and reception in full duplex communication mode, and the communication of the at least one of the first signal or the second signal includes communicating the first signal with the changed first beam configuration, and communicating the second signal using the CG UL resource with the second beam configuration.

20. The method of claim 16, wherein: the DL resource is periodic, the conflict resolution action is based on a rule to change a beam configuration associated with the CG UL resource to a second beam configuration that is compatible with a first beam configuration associated with the DL resource, and the communication of the at least one of the first signal or the second signal includes communicating the second signal using the CG UL resource with the changed second beam configuration, and communicating the first signal using the DL resource with the first beam configuration.

21. The method of claim 16, wherein: the DL resource is aperiodic, the conflict resolution action is based on a rule to apply a beam configuration to the CG UL resource, the beam configuration being based on an indication obtained from a new or repurposed field included in the control information that schedules the first signal, and the communication of the at least one of the first signal or the second signal includes communicating the second signal using the CG UL resource with the indicated beam configuration, and the first signal using the DL resource.

22. The method of claim 16, wherein: the DL resource is aperiodic, the conflict resolution action is based on a rule to drop at least a portion of the second signal based on an indication obtained from a field included in the control information that schedules the first signal, and the communication of the at least one of the first signal or the second signal includes communicating the first signal in response to dropping the at least portion of the second signal.

23. The method of claim 16, wherein the DL resource is aperiodic, further comprising: determining whether the first signal with a first beam configuration applied to the DL resource is compatible with the second signal with a second beam configuration applied to the CG UL resource for simultaneous transmission and reception in full duplex communication mode, wherein the conflict resolution action is based on a rule to drop at least a portion of the second signal in response to the first signal with the first beam configuration not being compatible with the second signal with the second beam configuration, and the communication of the at least one of the first signal or the second signal includes communicating the first signal and dropping the at least portion of the second signal in response to determining that the first signal is incompatible with the second signal.

24. The method of claim 16, wherein: the DL resource is aperiodic, the conflict resolution action is based on a rule to drop at least a portion of the second signal, and the communication of the at least one of the first signal or the second signal includes communicating the first signal.

25. The method of claim 16, wherein: the DL resource is aperiodic, the conflict resolution action is based on a rule to change a first beam configuration associated with the DL resource and a second beam configuration associated with the CG UL resource based on information included in a bi-directional transmission configuration indicator (TCI) state for full duplex mode field of the control information, the first and second beam configurations being compatible with each other, and the communication of the at least one of the first signal or the second signal includes communicating the first signal using the first beam configuration and communicating the second signal using the second beam configuration.

26. The method of claim 16, wherein: the DL resource is aperiodic, the conflict resolution action is based on a rule to change a beam configuration associated with the DL resource to a first beam configuration that is compatible with a second beam configuration associated with the CG UL resource, based on previous beam measurements or pre-configured candidate beam pairs, and the communication of the at least one of the first signal or the second signal includes communicating the first signal with the DL resource with the changed first beam configuration and communicating the second signal using the CG UL resource with the second beam configuration.

27. The method of claim 16, wherein: the DL resource is aperiodic, the conflict resolution action is based on a rule to change a beam configuration associated with the CG UL resource to a second beam configuration that is compatible with a first beam configuration associated with the DL resource, based on previous beam measurements or pre-configured candidate beam pairs, and the communication of the at least one of the first signal or the second signal includes communicating the first signal using the DL resource with the first beam configuration and communicating the second signal using the CG UL resource with the changed second beam configuration.

28. The method of claim 16, wherein: the first wireless communication device comprises a user equipment (UE), the second wireless communication device comprises a base station, and the communication of the control information includes receiving the control information from the second wireless communication device.

29. The method of claim 16, wherein: the first wireless communication device comprises a base station, the second wireless communication device comprises a user equipment (UE), and the communication of the control information includes transmitting the control information to the second wireless communication device.

30. The method of claim 16, wherein: the DL resource is a channel state information reference signal (CSI-RS) resource.

* * * * *